US012656654B2

(12) United States Patent
Miyazaki et al.

(10) Patent No.: US 12,656,654 B2
(45) Date of Patent: Jun. 16, 2026

(54) OPTICAL WAVEGUIDE ELEMENT, OPTICAL MODULATOR, OPTICAL MODULATION MODULE, AND OPTICAL TRANSMISSION DEVICE

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 306 days.

(21) Appl. No.: 18/550,475

(22) PCT Filed: Jun. 15, 2022

(86) PCT No.: PCT/JP2022/024024
§ 371 (c)(1),
(2) Date: Sep. 14, 2023

(87) PCT Pub. No.: WO2022/270389
PCT Pub. Date: Dec. 29, 2022

(65) Prior Publication Data
US 2024/0152021 A1    May 9, 2024

(30) Foreign Application Priority Data

Jun. 24, 2021    (JP) ................................. 2021-105201

(51) Int. Cl.
*G02F 1/21*        (2006.01)
*G02F 1/225*       (2006.01)
(52) U.S. Cl.
CPC ............ *G02F 1/212* (2021.01); *G02F 1/2255* (2013.01)

(58) Field of Classification Search
CPC ............................... G02F 1/2255; G02F 1/212
See application file for complete search history.

(56) References Cited

U.S. PATENT DOCUMENTS 10,185,165 B2 *   1/2019   Hosokawa .............. G02F 1/225
10,831,080 B2 *  11/2020   Villa ....................... G02F 1/011
(Continued)

FOREIGN PATENT DOCUMENTS

JP        2001-174765 A     6/2001
JP        2007-264548 A    10/2007
(Continued)

OTHER PUBLICATIONS

International Search Report, International Application No. PCT/ JP2022/024024, Date of mailing: Jul. 26, 2022, 3 pages.

*Primary Examiner* — Rhonda S Peace
(74) *Attorney, Agent, or Firm* — Rankin, Hill & Clark LLP

(57) ABSTRACT
In an optical waveguide device having a plurality of intersections between a convex optical waveguide and a signal electrode, the occurrence of disturbance modulation at the intersections is effectively reduced, thereby achieving good operating characteristics. The optical waveguide device includes an optical waveguide composed of a protruding portion extending on the substrate, and a signal electrode formed on the substrate and controlling a light wave propagating through the optical waveguide. The optical waveguide includes a Mach-Zehnder optical waveguide including two parallel waveguides having a curved portions, the signal electrode includes two signal lines intersecting the two parallel waveguides at the curved portions and transmitting a differential signal, and each of the two signal lines is configured such that the intersection lengths on the two parallel waveguides are the same as each other.

13 Claims, 16 Drawing Sheets

(56)        References Cited

U.S. PATENT DOCUMENTS

| | | | | |
|---|---|---|---|---|
| 10,955,723 | B2 * | 3/2021 | Sugiyama | G02F 1/218 |
| 11,003,044 | B2 * | 5/2021 | Hara | G02F 1/2255 |
| 11,650,476 | B2 * | 5/2023 | Cho | G02F 1/2255 |
| | | | | 385/3 |
| 2001/0007601 | A1 * | 7/2001 | Kondo | G02F 1/035 |
| | | | | 385/2 |
| 2008/0095485 | A1 * | 4/2008 | Sugiyama | G02F 1/0356 |
| | | | | 385/3 |
| 2010/0119189 | A1 * | 5/2010 | Nasu | H04B 10/676 |
| | | | | 385/11 |
| 2018/0039104 | A1 * | 2/2018 | Hosokawa | G02F 1/225 |
| 2019/0115980 | A1 * | 4/2019 | Ikeda | H04B 10/516 |
| 2019/0271896 | A1 * | 9/2019 | Sugiyama | G02F 1/218 |
| 2020/0041824 | A1 * | 2/2020 | Ohmori | G02F 1/035 |
| 2020/0064706 | A1 | 2/2020 | Villa et al. | |
| 2020/0272021 | A1 * | 8/2020 | Hara | G02F 1/0356 |
| 2020/0341345 | A1 * | 10/2020 | Kono | G02F 1/011 |
| 2021/0165299 | A1 * | 6/2021 | Motoya | G02F 1/2255 |
| 2022/0308286 | A1 * | 9/2022 | Nakata | G02F 1/212 |
| 2023/0367147 | A1 * | 11/2023 | Miyazaki | G02F 1/01 |
| 2023/0367169 | A1 * | 11/2023 | Okahashi | G02B 6/12 |
| 2024/0152021 | A1 * | 5/2024 | Miyazaki | G02F 1/2255 |
| 2024/0184181 | A1 * | 6/2024 | Miyazaki | G02F 1/225 |
| 2024/0319558 | A1 * | 9/2024 | Miyazaki | G02F 1/2255 |

FOREIGN PATENT DOCUMENTS

| | | | |
|---|---|---|---|
| JP | 2008-102451 | A | 5/2008 |
| JP | 2016-194574 | A | 11/2016 |
| JP | 2019-074612 | A | 5/2019 |
| JP | 2019-152732 | A | 9/2019 |
| JP | 2020-020953 | A | 2/2020 |
| JP | 2020-181173 | A | 11/2020 |
| JP | 2021-086026 | A | 6/2021 |
| WO | 2018/031916 | A1 | 2/2018 |

* cited by examiner

FIG. 1

OPTICAL MODULATOR UNIT A DETAILED

OPTICAL FOLDED PART B DETAILED

V-V CROSS SECTION

INTERSECTION REGION 400a4

FIRST MODIFICATION EXAMPLE OF INTERSECTION REGION

SECOND MODIFICATION EXAMPLE OF INTERSECTION REGION

IX–IX CROSS SECTION

X-X CROSS SECTION

THIRD MODIFICATION EXAMPLE OF INTERSECTION REGION

FOURTH MODIFICATION EXAMPLE OF INTERSECTION REGION

FIFTH MODIFICATION EXAMPLE OF INTERSECTION REGION

XIV-XIV CROSS SECTION

FIG. 15

OPTICAL WAVEGUIDE ELEMENT, OPTICAL MODULATOR, OPTICAL MODULATION MODULE, AND OPTICAL TRANSMISSION DEVICE

TECHNICAL FIELD

The present invention relates to an optical waveguide device, an optical modulator, an optical modulation module, and an optical transmission apparatus.

BACKGROUND ART

In a high-frequency and large-capacity optical fiber communication system, an optical modulator incorporating an optical modulation device as an optical waveguide device including an optical waveguide formed on a substrate and a control electrode for controlling light waves propagating in the optical waveguide is often used. Among these, optical modulation devices in which $LiNbO_3$ (hereinafter, also referred to as LN) having an electro-optic effect is used for substrates has a small optical loss and can realize a broadband optical modulation characteristic, so the optical modulation devices are widely used for high-frequency/large-capacity optical fiber communication systems.

In particular, due to the increasing transmission capacity in recent years, the mainstream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into metro networks.

Further, in recent years, in order to implement further low-voltage driving and high-frequency modulation while miniaturizing the optical modulator itself, optical modulators using a rib-type optical waveguide or ridge optical waveguide (hereinafter collectively referred to as convex optical waveguides) formed by forming strip-shaped protruding portions on the surface of a thinned LN substrate (thin plate) (for example, a thickness of 20 μm or less) to further strengthen the interaction between the signal electric field and the guided light in the substrate are also being put to practical use (for example, Patent Literatures No. 1 and No. 2).

Further, in addition to reducing the size of the optical modulation device, for example, efforts are underway to house an electronic circuit and an optical modulation device in one housing and to integrate them into an optical modulation module. For example, an optical modulation module designed to be miniaturized and integrated has been proposed in which an optical modulation device and a high-frequency driver amplifier driving the optical modulation device are integrated and housed in one housing, and optical input and output portions are disposed in parallel on one surface of the housing. In the optical modulation device used in such an optical modulation module, the optical waveguide is formed on the substrate such that the light propagation direction is folded back such that an optical input end and an optical output end of the optical waveguide are disposed on one side of the substrate configuring the optical modulation device (for example, Patent Literature No. 3). Hereinafter, an optical modulation device including an optical waveguide including such a folded portion in the light propagation direction will be referred to as a folded optical modulation device.

Incidentally, an optical modulator that performs QPSK modulation (QPSK optical modulator) and an optical modulator that performs DP-QPSK modulation (DP-QPSK optical modulator) each include a plurality of Mach-Zehnder optical waveguides having a so-called nested structure called a nested type, which has at least one signal electrode to which a high-frequency signal is applied. These signal electrodes formed on the substrate extend to the vicinity of the outer periphery of the LN substrate for connection with an electric circuit outside the substrate. Therefore, on the substrate, the plurality of optical waveguides and the plurality of signal electrodes intersect in a complicated manner, and a plurality of intersections where the signal electrodes traverse the optical waveguides are formed.

At such intersections, an electric field is applied from the signal electrode crossing over the optical waveguide to the portion of the optical waveguide below the signal electrode, and the phase of the light propagating through the optical waveguide is slightly changed and modulated. The phase change or phase modulation of light at such intersections may act as noise for the optical phase change for normal modulation generated in the optical waveguide by the signal electrode and disturb the optical modulation operation. Hereinafter, phase modulation due to noise generated at such intersections is referred to as disturbance modulation.

The degree of the noise effect of the disturbance modulation on the optical modulation operation in the optical modulator is larger as the electric field applied from the signal electrode to the optical waveguide at the intersection is stronger, and also increases due to addition effects proportional to the number of intersections (for example, depending on the sum of the lengths of intersections (intersection lengths) along the signal electrodes).

For example, while in a configuration in the related art in which an optical waveguide formed by diffusing a metal such as Ti on the flat surface of an LN substrate (so-called planar optical waveguide) intersects with a signal electrode formed on the substrate plane of the LN substrate, the signal electrode is formed only on the upper surface (substrate surface) of the optical waveguide, in a configuration in which the convex optical waveguide and the signal electrode intersect as described above, the signal electrode can also be formed on the upper surface and two side surfaces of the protruding portion of the convex optical waveguide. Therefore, since the electric field applied from the signal electrode to the optical waveguide at the intersection is stronger in the case of the convex optical waveguide than in the case of the planar optical waveguide, and the interaction with light waves that are even more strongly confined becomes stronger, the noise due to the disturbance modulation can occur larger in the convex optical waveguide than in the case of the planar optical waveguide.

Further, in the folded optical modulation device as described above, there are more intersections between the electrode and the optical waveguide than in a non-folded optical modulation device formed of an optical waveguide that does not include a light folded portion (for example, see FIG. 1 of Patent Literature No. 3), so that the noise due to the disturbance modulation can be larger. For example, in the case of the DP-QPSK modulation element described above, while in the non-folded optical modulation device, the number of intersections in one electrode is about 2 to 4, and the total intersection length is several tens of microns (for example, a range from 20 μm to 40 μm), in the folded optical modulation device, the number of intersections in one electrode may reach a several tens, and the total intersection length may be several hundred microns to several millimeters.

Therefore, particularly in the folded optical modulation device configured by using the convex optical waveguide, the noise due to the disturbance modulation generated at the intersections may be so large that it cannot be ignored for the normal optical modulation operation. Further, particularly in the Mach-Zehnder optical waveguide including two parallel waveguides, the disturbance modulation not only generates noise in each optical signal propagating in these parallel waveguides, but also generates noise in the phase difference between these two signal lights. This phase difference noise causes a larger noise due to the optical interference action when these light waves are combined in the Mach-Zehnder optical waveguide, and can have a great influence on the optical modulation operation.

In addition, the above intersections can also be formed in various optical waveguide devices such as optical waveguide devices using a semiconductor such as InP as a substrate and silicon photonics waveguide devices using Si as a substrate, as well as the LN substrates. Moreover, such optical waveguide devices may be various optical waveguide devices such as optical modulators using Mach-Zehnder optical waveguides, optical modulators using optical waveguides forming a directional coupler or a Y branch, or optical switches.

Then, when the optical waveguide pattern and the electrode pattern become complicated due to further miniaturization, multi-channelization, and/or high integration of the optical waveguide device, the number of intersections on the substrate increases more and more, and noise due to disturbance modulation may become a non-negligible factor and limit the performance of the optical waveguide device.

CITATION LIST

Patent Literature

[Patent Literature No. 1] Japanese Laid-open Patent Publication No. 2007-264548
[Patent Literature No. 2] Pamphlet of International Publication No. WO2018/031916
[Patent Literature No. 3] Japanese Laid-open Patent Publication No. 2019-152732

SUMMARY OF INVENTION

Technical Problem

From the above background, in an optical waveguide device having a plurality of intersections between convex optical waveguides and signal electrodes for propagating electrical signals, it is required to effectively reduce the occurrence of disturbance modulation at the intersections to achieve good operating characteristics.

Solution to Problem

One aspect of the present invention is an optical waveguide device including: an optical waveguide composed of a protruding portion extending on a substrate; and a signal electrode that is formed on the substrate and controls light waves propagating through the optical waveguide, in which the optical waveguide includes a Mach-Zehnder optical waveguide including two parallel waveguides having curved portions, the signal electrode includes two signal lines for transmitting a differential signal, each intersecting the two parallel waveguides at the curved portions, and each of the two signal lines is configured such that intersection lengths on the two parallel waveguides are the same as each other.

According to another aspect of the present invention, in the two signal lines, a clearance in portions intersecting the parallel waveguide is narrower than a clearance in portions not intersecting the parallel waveguide.

According to another aspect of the present invention, in the two signal lines, the clearance in the portions intersecting the parallel waveguide is narrower than a clearance in portions upstream of the portions intersecting the parallel waveguide along a propagation direction of the differential signal.

According to another aspect of the present invention, in the two signal lines, a clearance in portions downstream of the portions intersecting the parallel waveguide along the propagation direction of the differential signal is wider than the clearance in the portions intersecting the parallel waveguide.

According to another aspect of the present invention, the two signal lines each are formed such that intersection angles with the two parallel waveguides are the same as each other.

According to another aspect of the present invention, the two signal lines intersect each other in a region on the substrate sandwiched between the two parallel waveguides.

According to another aspect of the present invention, in the two signal lines, portions intersecting the parallel waveguide overlap each other in plan view of the substrate.

According to another aspect of the present invention, an insulating layer made of resin is provided between the parallel waveguide and the two signal lines at portions where the two signal lines intersect the parallel waveguide.

Another aspect of the present invention is an optical modulator including: the optical waveguide device described in any one of the above aspects, which is an optical modulation device that modulates light; a housing that houses the optical waveguide device; an optical fiber that inputs light to the optical waveguide device; and an optical fiber that guides light output by the optical waveguide device to outside the housing.

Another aspect of the present invention is an optical modulation module including: the optical waveguide device which is an optical modulation device that modulates light; and a drive circuit that drives the optical waveguide device.

Still another aspect of the present invention is an optical transmission apparatus including: the optical modulator or the optical modulation module; and an electronic circuit that generates an electrical signal for causing the optical waveguide device to perform a modulation operation.

This specification includes all the contents of Japanese Patent Application No. 2021-105201 filed on Jun. 24, 2021.

Advantageous Effects of Invention

According to the present invention, in an optical waveguide device having a plurality of intersections between convex optical waveguides and electrodes for propagating electrical signals, the occurrence of disturbance modulation at the intersections is effectively reduced, thereby achieving good operating characteristics.

BRIEF DESCRIPTION OF DRAWINGS

FIG. 1 is a diagram illustrating a configuration of an optical modulator according to a first embodiment of the present invention.

FIG. 15 is a diagram illustrating a configuration of an optical modulation module according to a second embodiment of the present invention.

DESCRIPTION OF EMBODIMENTS

Figure 2:
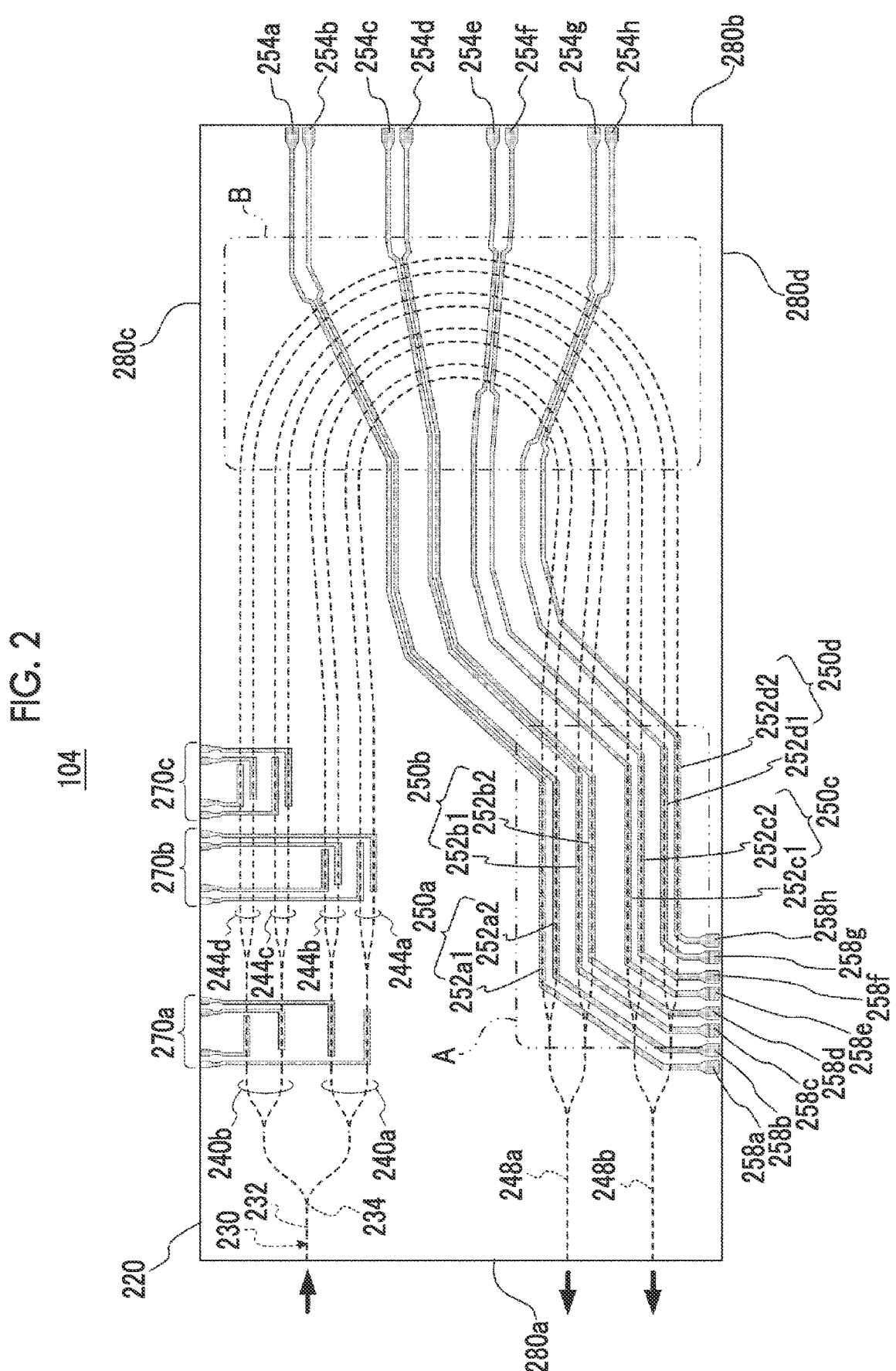
FIG. 2 is a diagram illustrating a configuration of an optical modulation device used in the optical modulator illustrated in FIG. 1.

Hereinafter, embodiments of the present invention will be described with reference to the drawings.

1. First Embodiment

Figure 1:
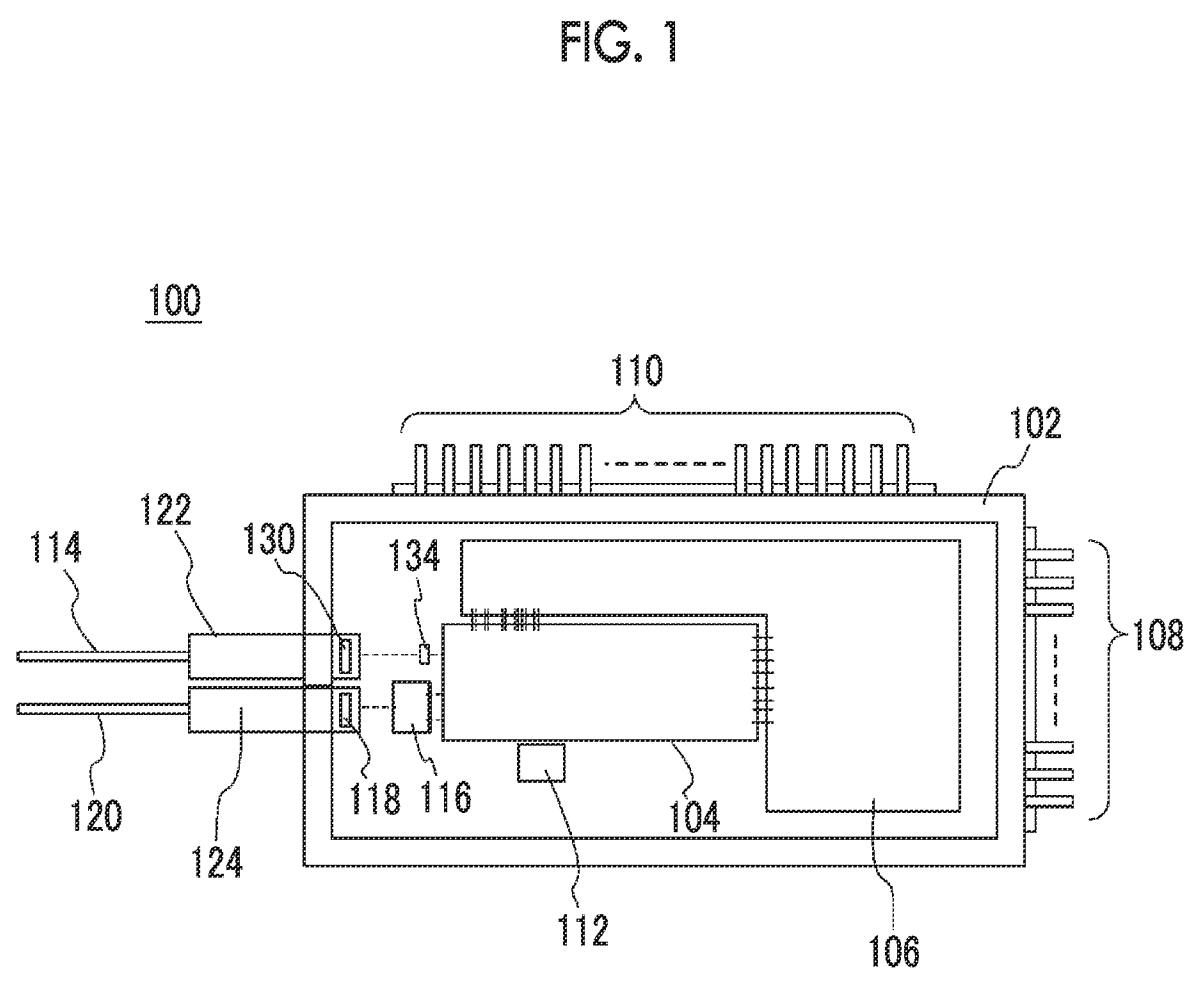

First, a first embodiment will be described. FIG. 1 is a diagram illustrating a configuration of an optical modulator 100 using an optical modulation device, which is an optical waveguide device according to a first embodiment of the present invention. The optical modulator 100 includes a housing 102, an optical modulation device 104 housed in the housing 102, and a relay substrate 106. The optical modulation device 104 is, for example, a configuration of a DP-QPSK modulator. Finally, a cover (not shown), which is a plate body, is fixed to the opening of the housing 102, and the inside of the housing 102 is hermetically sealed.

The optical modulator 100 has signal pins 108 for receiving a high-frequency electrical signal used for modulation of the optical modulation device 104, and signal pins 110 for inputting an electrical signal used for adjusting the operating point of the optical modulation device 104.

Further, the optical modulator 100 includes an input optical fiber 114 for inputting light into the housing 102 and an output optical fiber 120 for guiding the light modulated by the optical modulation device 104 to the outside of the housing 102 on the same surface of the housing 102.

Here, the input optical fiber 114 and the output optical fiber 120 are fixed to the housing 102 via the supports 122 and 124 which are fixing members, respectively. The light input from the input optical fiber 114 is collimated by the lens 130 disposed in the support 122, and then input to the optical modulation device 104 via the lens 134. However, this is only an example, and the input of light to the optical modulation device 104 may be performed by introducing, for example, the input optical fiber 114 into the housing 102 via the support 122, and connecting the end face of the introduced input optical fiber 114 to the end face of the substrate 220 (described later) of the optical modulation device 104, according to the related art.

The optical modulator 100 also has an optical unit 116 that polarizes and synthesizes two beams of modulated light output from the optical modulation device 104. The light after polarization synthesis, output from the optical unit 116, is collected by the lens 118 disposed in the support 124 and coupled to the output optical fiber 120.

The relay substrate 106 relays the high-frequency electrical signal input from the signal pins 108 and the electrical signal for adjusting an operating point input from the signal pins 110 to the optical modulation device 104, according to a conductor pattern (not shown) formed on the relay substrate 106. The conductor pattern on the relay substrate 106 is connected to a pad (described later) configuring one end of the electrode of the optical modulation device 104 by wire bonding or the like, for example. Further, the optical modulator 100 includes a terminator 112 having a predetermined impedance in the housing 102.

Figure 3:
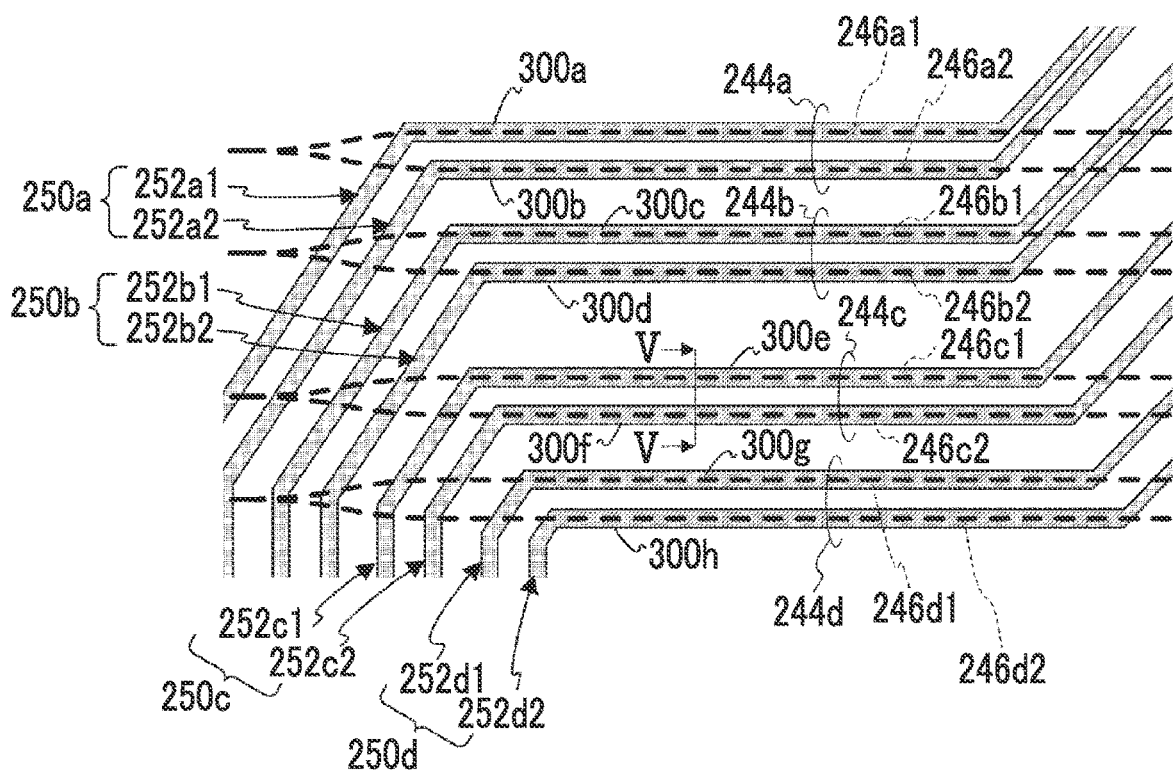
FIG. 3 is a partial detailed view of an optical modulator unit A of the optical modulation device illustrated in FIG. 2.
Figure 4:
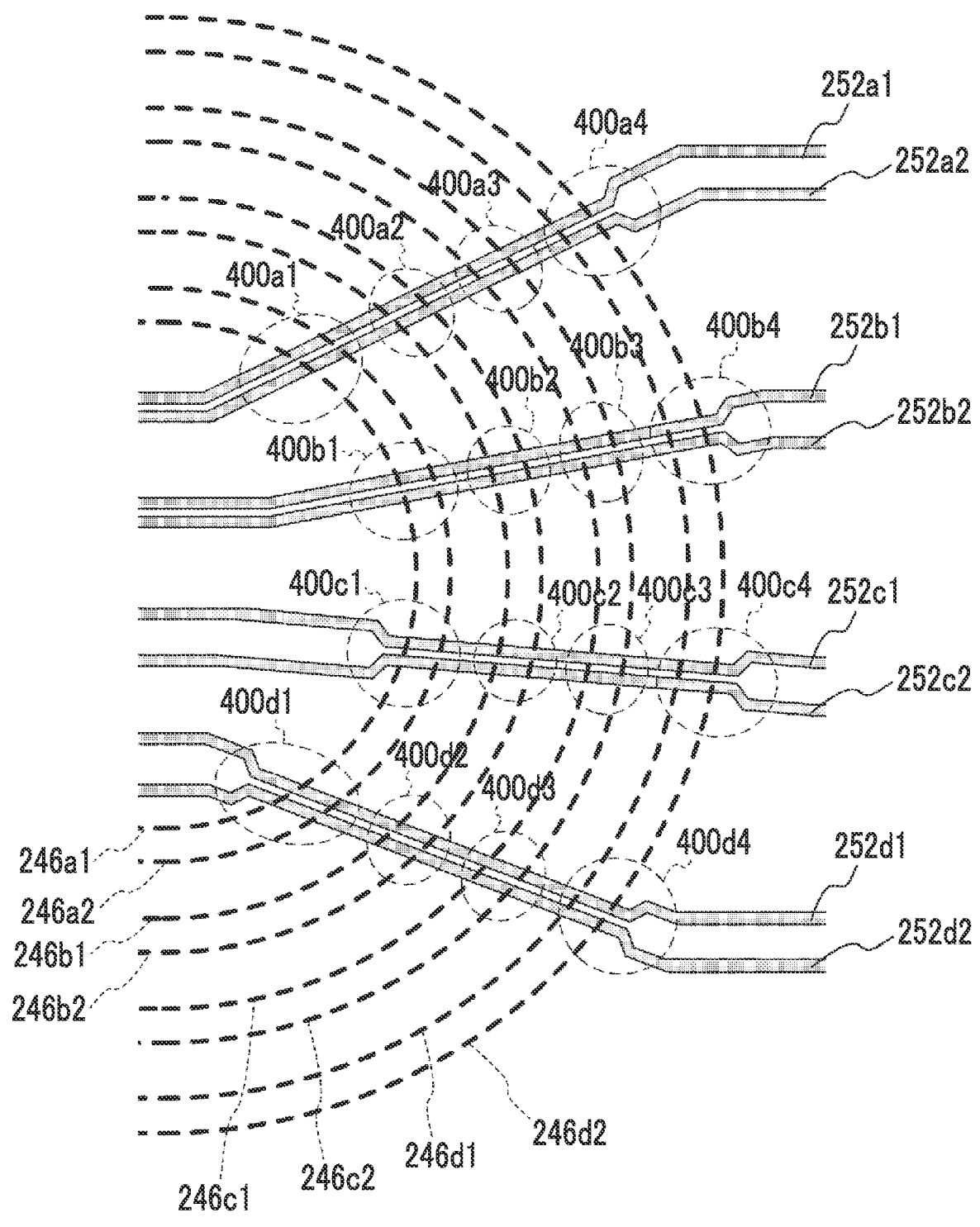
FIG. 4 is a partial detailed view of an optical folded part B of the optical modulation device illustrated in FIG. 2.

FIG. 2 is a diagram illustrating an example of the configuration of the optical modulation device 104, which is housed in the housing 102 of the optical modulator 100 illustrated in FIG. 1. Further, FIGS. 3 and 4 are partial detailed views of the optical modulator unit A and the optical folded part B (described later) of the optical modulation device 104 shown in FIG. 2, respectively.

The optical modulation device 104 is formed of an optical waveguide 230 (the shown entire bold dotted line) formed on a substrate 220, and performs, for example, 200 G DP-QPSK modulation. The substrate 220 is, for example, a thinned Z-cut LN substrate having an electro-optic effect, which is processed to a thickness of 20 μm or less (for example, 2 μm). The optical waveguide 230 is a convex optical waveguide (for example, a rib-type optical waveguide or a ridge optical waveguide) including a strip-shaped extending protruding portion formed on the surface of the thinned substrate 220. Here, since in the LN substrate, the refractive index can locally change due to the photoelastic effect when stress is applied, the LN substrate is generally adhered to a silicon (Si) substrate, a glass substrate, an LN supporting plate, or the like in order to reinforce the mechanical strength of the entire substrate. In the present embodiment, as will be described later, the substrate 220 is adhered to the supporting plate 500.

The substrate 220 is, for example, rectangular and has two left and right sides 280a and 280b extending in the vertical direction and facing each other, and upper and lower sides 280c and 280d extending in the left and right direction and facing each other, in the drawing.

The optical waveguide 230 includes an input waveguide 232 that receives the input light (arrow pointing to the right) from the input optical fiber 114 on the upper side of the left side 280a of the substrate 220, and a branched waveguide 234 that branches the input light into two light beams having the same light amount, in the drawing. Further, the optical waveguide 230 includes a so-called nested Mach-Zehnder optical waveguides 240*a* and 240*b*, which are two modulation parts for modulating each light branched by the branched waveguide 234.

The nested Mach-Zehnder optical waveguides 240*a* and 240*b* respectively include two Mach-Zehnder optical waveguides 244*a* and 244*b*, and 244*c* and 244*d* respectively provided in two waveguide parts forming a pair of parallel waveguides. As shown in FIG. 3, the Mach-Zehnder optical waveguides 244*a* and 244*b* have parallel waveguides 246*a*1 and 246*a*2 and parallel waveguides 246*b*1 and 246*b*2, respectively. Further, the Mach-Zehnder optical waveguides 244*c* and 244*d* have parallel waveguides 246*c*1 and 246*c*2 and parallel waveguides 246*d*1 and 246*d*2, respectively.

Hereinafter, the nested Mach-Zehnder optical waveguides 240*a* and 240*b* are collectively referred to as nested Mach-Zehnder optical waveguides 240, and the Mach-Zehnder optical waveguides 244*a*, 244*b*, 244*c*, and 244*d* are collectively referred to as Mach-Zehnder optical waveguides 244. Further, the parallel waveguides 246*a*1 and 246*a*2 are collectively referred to as parallel waveguides 246*a*, and the parallel waveguides 246*b*1 and 246*b*2 are collectively referred to as parallel waveguides 246*b*. Further, the parallel waveguides 246*c*1 and 246*c*2 are collectively referred to as parallel waveguides 246*c*, and the parallel waveguides 246*d*1 and 246*d*2 are collectively referred to as parallel waveguides 246*d*. Further, the parallel waveguides 246*a*, 246*b*, 246*c*, and 246*d* are collectively referred to as parallel waveguides 246.

As shown in FIG. 2, the nested Mach-Zehnder optical waveguide 240 includes an optical modulator unit A and an optical folded part B (each of which is a part indicated by a rectangular shape of a shown two-dot chain line). The optical folded part B is a part at which the propagation direction of light in the two nested Mach-Zehnder optical waveguides 240 is changed. Specifically, each of the Mach-Zehnder optical waveguides 244 configuring the nested Mach-Zehnder optical waveguide 240 has two parallel waveguides 246 having curved portions, and the optical folded part B is composed of curved portions of a total of eight parallel waveguides 246 that configure two nested Mach-Zehnder optical waveguides 240.

In the present embodiment, in the nested Mach-Zehnder optical waveguide 240, each of the input light branched into two beams by the branched waveguide 234 is QPSK-modulated in the optical modulator unit A after the light propagation direction is folded back by 180 degrees in the optical folded part B, and then the modulated light (output) is output from the respective output waveguides 248*a* and 248*b* to the left in the drawing. These two output light beams are then polarized and synthesized by an optical unit 116 disposed outside the substrate 220 and are combined into one light beam.

On the substrate 220, four signal electrodes 250*a*, 250*b*, 250*c*, and 250*d* for respectively causing total four Mach-Zehnder optical waveguides 244*a*, 244*b*, 244*c*, and 244*d* configuring the nested Mach-Zehnder optical waveguides 240*a* and 240*b* to perform modulation operations are provided. Hereinafter, the signal electrodes 250*a*, 250*b*, 250*c*, and 250*d* are collectively referred to as signal electrodes 250.

Each of the signal electrodes 250 includes two signal lines. That is, the signal electrode 250*a* includes the signal lines 252*a*1 and 252*a*2, and the signal electrode 250*b* includes the signal lines 252*b*1 and 252*b*2. Further, the signal electrode 250*c* includes the signal lines 252*c*1 and 252*c*2, and the signal electrode 250*d* includes the signal lines 252*d*1 and 252*d*2. Hereinafter, the signal lines 252*a*1 and 252*a*2 are collectively referred to as signal lines 252*a*, and the signal lines 252*b*1 and 252*b*2 are collectively referred to as signal lines 252*b*. Further, the signal lines 252*c*1 and 252*c*2 are collectively referred to as signal lines 252*c*, and the signal lines 252*d*1 and 252*d*2 are collectively referred to as signal lines 252*d*. Further, the signal lines 252*a*, 252*b*, 252*c*, and 252*d* are collectively referred to as signal lines 252.

A high-frequency electrical signal for causing the corresponding Mach-Zehnder optical waveguide 244 to perform a modulation operation is input to each of the signal electrodes 250. This high-frequency electrical signal is composed of two electrical signals having a phase difference of 180° from each other, that is, a differential signal. The two signal lines 252 configuring each of the signal electrodes 250 each transmit the two electrical signals configuring the differential signal input to the signal electrode 250.

As shown in FIG. 3, in the optical modulator unit A, the signal lines 252*a*1 and 252*a*2 configuring the signal electrode 250*a* have action portions 300*a* and 300*b* (shown hatched portions) formed above the parallel waveguides 246*a*1 and 246*a*2 of the Mach-Zehnder optical waveguide 244*a*, and propagate differential signals having a phase difference of 180° from each other to cause the Mach-Zehnder optical waveguide 244*a* to perform a modulation operation. The signal lines 252*b*1 and 252*b*2 configuring the signal electrode 250*b* have action portions 300*c* and 300*d* formed above the parallel waveguides 246*b*1 and 246*b*2 of the Mach-Zehnder optical waveguide 244*b*, and propagate differential signals having a phase difference of 180° from each other to cause the Mach-Zehnder optical waveguide 244*b* to perform a modulation operation.

Similarly, the signal lines 252*c*1 and 252*c*2 configuring the signal electrode 250*c* have action portions 300*e* and 300*f* formed above the parallel waveguides 246*c*1 and 246*c*2 of the Mach-Zehnder optical waveguide 244*c*, and propagate differential signals having a phase difference of 180° from each other to cause the Mach-Zehnder optical waveguide 244*c* to perform a modulation operation. Further, the signal lines 252*d*1 and 252*d*2 configuring the signal electrode 250*d* have action portions 300*g* and 300*h* formed above the parallel waveguides 246*d*1 and 246*d*2 of the Mach-Zehnder optical waveguide 244*d*, and propagate differential signals having a phase difference of 180° from each other to cause the Mach-Zehnder optical waveguide 244*d* to perform a modulation operation.

Hereinafter, the action portions 300*a*, 300*b*, 300*c*, 300*d*, 300*e*, 300*f*, 300*g*, and 300*h* are collectively referred to as action portions 300.

As shown in FIG. 4, in the optical folded part B, each of two signal lines 252 forming the signal electrode 250 intersects two parallel waveguides 246 configuring each of four Mach-Zehnder optical waveguides 244 in the curved portions of respective two parallel waveguides 246. Here, on the surface of the substrate 220, a portion where the two signal lines 252 for propagating the differential signal and the two parallel waveguides 246 configuring one Mach-Zehnder optical waveguide 244 intersect is also referred to as an intersection region.

That is, in FIG. 4, the two signal lines 252*a* (that is, the signal lines 252*a*1 and 252*a*2) propagating the differential signal and two parallel waveguides 246*a* (that is, the parallel waveguides 246*a*1 and 246*a*2) configuring the Mach-Zehnder optical waveguide 244*a* intersect in the intersection region 400*a*1. Further, the signal lines 252*a* intersect two parallel waveguides 246*b*, 246*c*, and 246*d*, respectively, which configure the Mach-Zehnder optical waveguides 244*b*, 244*c*, and 244*d*, respectively, in the intersection regions 400*a*2, 400*a*3, and 400*a*4.

Similarly, the two signal lines 252*b* intersect two parallel waveguides 246*a*, 246*b*, 246*c*, and 246*d*, respectively, which configure the Mach-Zehnder optical waveguides 244*a*, 244*b*, 244*c*, and 244*d*, respectively, in the intersection regions 400*b*1, 400*b*2, 400*b*3, and 400*b*4. The two signal lines 252*c* intersect two parallel waveguides 246*a*, 246*b*, 246*c*, and 246*d*, respectively, which configure the Mach-Zehnder optical waveguides 244*a*, 244*b*, 244*c*, and 244*d*, respectively, in the intersection regions 400*c*1, 400*c*2, 400*c*3, and 400*c*4. Further, the two signal lines 252*d* intersect two parallel waveguides 246*a*, 246*b*, 246*c*, and 246*d*, respectively, which configure the Mach-Zehnder optical waveguides 244*a*, 244*b*, 244*c*, and 244*d*, respectively, in the intersection regions 400*d*1, 400*d*2, 400*d*3, and 400*d*4.

Hereinafter, the intersection regions 400*a*1, 400*a*2, 400*a*3, and 400*a*4 are collectively referred to as intersection regions 400*a*, and the intersection regions 400*b*1, 400*b*2, 400*b*3, and 400*b*4 are collectively referred to as intersection regions 400*b*. Further, the intersection regions 400*c*1, 400*c*2, 400*c*3, and 400*c*4 are collectively referred to as intersection regions 400*c*, and the intersection regions 400*d*1, 400*d*2, 400*d*3, and 400*d*4 are collectively referred to as intersection regions 400*d*. Further, the intersection regions 400*a*, 400*b*, 400*c*, and 400*d* are collectively referred to as intersection regions 400.

With reference to FIG. 2, the signal lines 252*a*1, 252*a*2, 252*b*1, 252*b*2, 252*c*1, 252*c*2, 252*d*1, and 252*d*2 each extend to the right of the substrate 220, cross over the eight parallel waveguides 246 in the optical folded part B, and then, extend to the side 280*b* and are connected to the pads 254*a*, 254*b*, 254*c*, 254*d*, 254*e*, 254*f*, 254*g*, and 254*h*.

Hereinafter, the pads 254*a*, 254*b*, 254*c*, 254*d*, 254*e*, 254*f*, 254*g*, and 254*h* are collectively referred to as pads 254. Each of the pads 254 is connected to the relay substrate 106 of the optical modulator 100 shown in FIG. 1 by wire bonding or the like.

The left sides of the signal lines 252*a*1, 252*a*2, 252*b*1, 252*b*2, 252*c*1, 252*c*2, 252*d*1, and 252*d*2 are bent downward in the drawing and extend to the side 280*d* of the substrate 220, and connected to the pads 258*a*, 258*b*, 258*c*, 258*d*, 258*e*, 258*f*, 258*g*, and 258*h*. Hereinafter, the pads 258*a*, 258*b*, 258*c*, 258*d*, 258*e*, 258*f*, 258*g*, and 258*h* are collectively referred to as pads 258. The pads 258 are respectively connected to eight termination resistors (not shown) constituting the terminator 112 by wire bonding or the like.

In FIG. 2, according to the related art, the signal lines 252 together with ground electrodes (not shown) formed to sandwich the signal lines 252 on the surface of the substrate 220 configure a coplanar transmission line having a predetermined impedance.

Thus, the high-frequency electrical signals input from the signal pin 108 to each of the pads 254 via the relay substrate 106 become traveling waves to propagate through the respective signal lines 252, and modulate the light waves propagating through the Mach-Zehnder optical waveguide 244, in each of the action portions 300.

Figure 5:
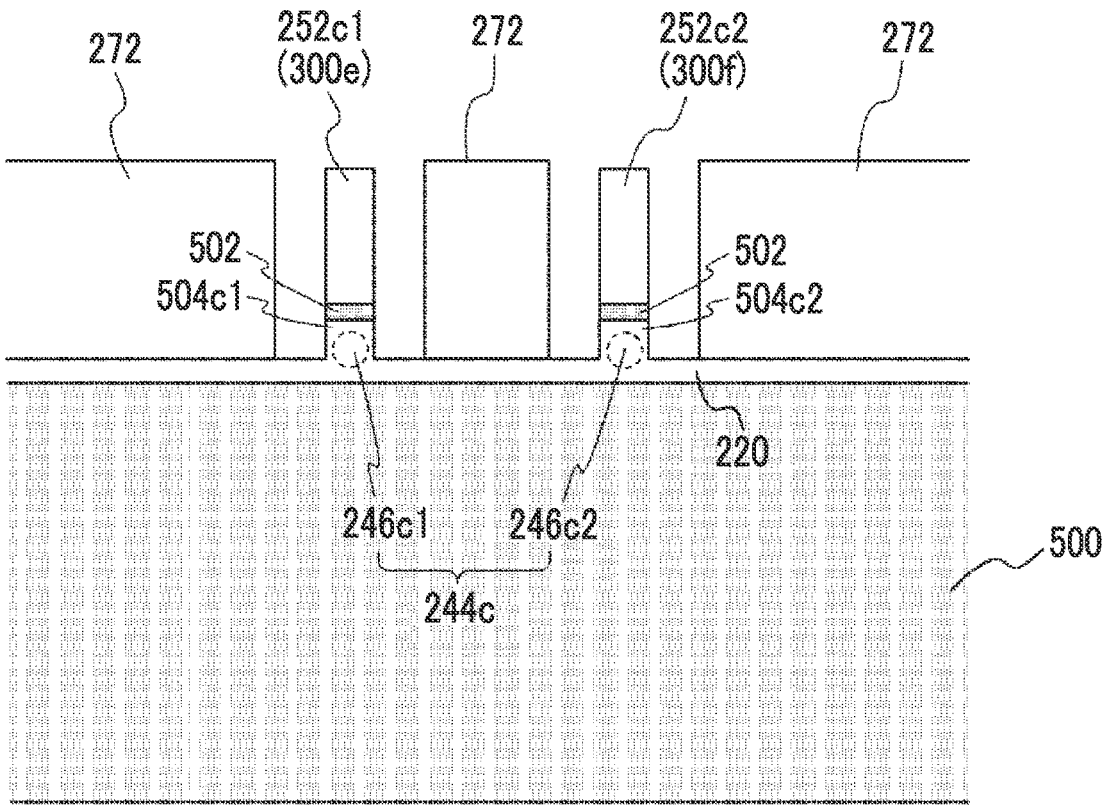
FIG. 5 is a cross-sectional view taken along line V-V of the optical modulator unit A illustrated in FIG. 3.

FIG. 5 is a cross-sectional view taken along line V-V of the optical modulator unit A shown in FIG. 3, and is a diagram illustrating the cross-sectional structure of the signal lines 252*c*1 and 252*c*2 (specifically, the action portions 300*e* and 300*f*) configuring the signal electrode 250*c*. In the optical modulator unit A, the other signal lines 252 are configured in the same manner as the signal lines 252*c*1 and 252*c*2 shown in FIG. 5.

In FIG. 5, the substrate 220 is adhesively fixed to the supporting plate 500 such as glass for reinforcement. Protruding portions 504*c*1 and 504*c*2 forming parallel waveguides 246*c*1 and 246*c*2 of the Mach-Zehnder optical waveguide 244*c*, which is a convex optical waveguide, are formed on the substrate 220. Here, the broken circles shown in FIG. 5 schematically show the field diameters of the light waves propagating through the parallel waveguides 246*c*1 and 246*c*2.

Intermediate layers 502 are formed on the protruding portions 504*c*1 and 504*c*2, respectively, and the signal lines 252*c*1 and 252*c*2 (specifically, action portions 300*e* and 300*f*) are formed on the intermediate layers 502, respectively. The intermediate layer 502 is, for example, $SiO_2$ (silicon dioxide). However, this is only an example, and the intermediate layer 502 may be a resin such as a photosensitive permanent film described later.

Further, on the substrate 220, three ground electrodes 272 are formed at positions sandwiching the signal lines 252*c*1 and 252*c*2 on the surface of the substrate 220, respectively. The clearance between each of the ground electrodes 272 and the signal lines 252*c*1 and 252*c*2 is determined from various design conditions such as an impedance required for the coplanar transmission line formed by the ground electrodes 272 and the signal lines 252*c*1 and 252*c*2 and the widths of the protruding portions 504*c*1 and 504*c*2, according to the related art. Hereinafter, the protruding portions on the substrate 220 configuring the optical waveguide 230, including the protruding portions 504*c*1 and 504*c*2, are collectively referred to as the protruding portions 504.

Here, the substrate 220 is formed in a thickness of 20 μm or less, preferably 10 μm or less, such that the interaction between the electric field formed by the signal lines 252 in the protruding portions 504 and the guided light propagating through the Mach-Zehnder optical waveguides 244 is further strengthened to perform a high-frequency modulation operation at a lower voltage. In the present embodiment, for example, the thickness of the substrate 220 is 1.2 μm, and the height of the protruding portions 504 forming the optical waveguide 230 is 0.8 μm.

In FIG. 5, the intermediate layer 502 is provided only on the protruding portion 504 forming the optical waveguide 230, but the intermediate layer 502 may be formed over the entire surface of the substrate 220. In addition to this, the intermediate layer 502 may be formed on the side surfaces (the left and right side surfaces in the drawing) of the protruding portion 504. For example, when the intermediate layer 502 is made of a resin such as a photosensitive permanent film, the intermediate layer 502 can be easily formed on the side surfaces of the protruding portion 504.

With reference to FIG. 2, the optical modulation device 104 is also provided with bias electrodes 270*a*, 270*b*, and 270*c* for adjusting the operating point by compensating for bias point fluctuations due to so-called DC drift. The bias electrode 270*a* is used to compensate for bias point fluctuations of the nested Mach-Zehnder optical waveguides 240*a* and 240*b*. Further, the bias electrodes 270*b* and 270*c* are used to compensate for bias point fluctuations of the Mach-Zehnder optical waveguides 244*a* and 244*b*, and the Mach-Zehnder optical waveguides 244*c* and 244*d*, respectively.

These bias electrodes 270*a*, 270*b*, and 270*c* each extend to the shown upper side 280*c* of the substrate 220 and are connected to one of the signal pins 110 via the relay substrate 106. A corresponding signal pin 110 is connected to a bias control circuit provided outside the housing 102. Thus, the bias electrodes 270*a*, 270*b*, and 270*c* are driven by the bias control circuit, and the operating point is adjusted so as to compensate for fluctuations in the bias point of the corresponding each Mach-Zehnder optical waveguide. Hereinafter, the bias electrodes 270a, 270b, and 270c are collectively referred to as bias electrodes 270.

The bias electrode 270 is an electrode to which a direct current or low frequency electrical signal is applied, and are formed with a thickness in the range of 0.3 μm or more and 5 μm or less, for example, when the thickness of the substrate 220 is 20 μm. On the other hand, the signal lines 252 configuring the signal electrodes 250 are formed in the range of 20 μm or more and 40 μm or less, for example, in order to reduce the conductor loss of the high-frequency electrical signal to be applied. The thickness of the signal line 252 is determined according to the thickness of the substrate 220 in order to set the impedance and microwave effective refractive index to desired values, and it can be determined thicker when the thickness of the substrate 220 is thick, and it can be determined to be thinner when the thickness of the substrate 220 is thin.

As described above, in the optical modulation device 104, each of signal lines 252 forming the signal electrodes 250 crosses over the parallel waveguides 246 in the curved portions of eight parallel waveguides 246 forming the optical folded part B. Therefore, if the above-described disturbance modulations caused by the intersection of the eight parallel waveguides 246 and the signal lines 252 occur, the modulation operation of the optical modulation device 104 may deteriorate. (Disturbance modulation generated in two Mach-Zehnder parallel waveguides greatly affects the modulation operation)

In order to reduce such disturbance modulation, in the optical modulation device 104 in the present embodiment, particularly in each of the intersection regions 400, each of the two signal lines 252 propagating the differential signal is configured such that in two intersections with the two respective parallel waveguides 246 of the corresponding Mach-Zehnder optical waveguide 244, the intersection lengths on the parallel waveguides 246 have substantially the same angle and/or substantially the same length. Here, the intersection length can be defined as a length measured along the parallel waveguide 246.

Thus, at two intersections in the parallel waveguide 246, that is, two intersections with the two signal lines 252 propagating differential signals of opposite phases to each other, disturbance modulations of opposite phases to each other occurs at the same intensity, so that these disturbance modulations cancel each other out. As a result, in each of the parallel waveguides 246, the disturbance modulation can be effectively reduced as the sum.

Here, the "same length" and "substantially the same length" with respect to the intersection lengths at the two intersections of the parallel waveguide 246 mean the same length including an error to an extent in which the disturbance modulation can be canceled to a predetermined degree (for example, ⅒) due to the intersection. Further, the "same angle" and "substantially the same angle" with respect to the intersection angles at the two intersections of the parallel waveguide 246 mean the same angle including an error to an extent in which the intersection lengths at the two intersections are the "same length" and "substantially the same length" in the above meaning.

Specifically, in the present embodiment, the two signal lines 252 configuring the signal electrode 250 are formed such that the clearance in the portions intersecting the same parallel waveguide 246 is narrower than the clearance in the portions not intersecting the parallel waveguide 246. Thus, since the clearance between the two intersections of the two signal lines 252 in one parallel waveguide 246 becomes close to each other, the intersection angles between the parallel waveguide 246 and the signal lines 252 at the two intersections are substantially the same as each other. As a result, if the two signal lines are configured to have the same width, the intersection lengths at these two intersections are substantially the same length.

In the present embodiment, more specifically, in the two signal lines 252, the clearance in the portions intersecting the same parallel waveguide 246 is narrower than the clearance in the portions upstream of the intersecting portion along the propagation direction of the differential signal. Thus, for example, in the two signal lines, the clearance in the portions intersecting the same parallel waveguide 246 is made narrower than the clearance between the pads 254 (for example, the clearance between the pads 254a and 254b), and the clearance in the intersecting portion can be brought close to each other.

Figure 6:
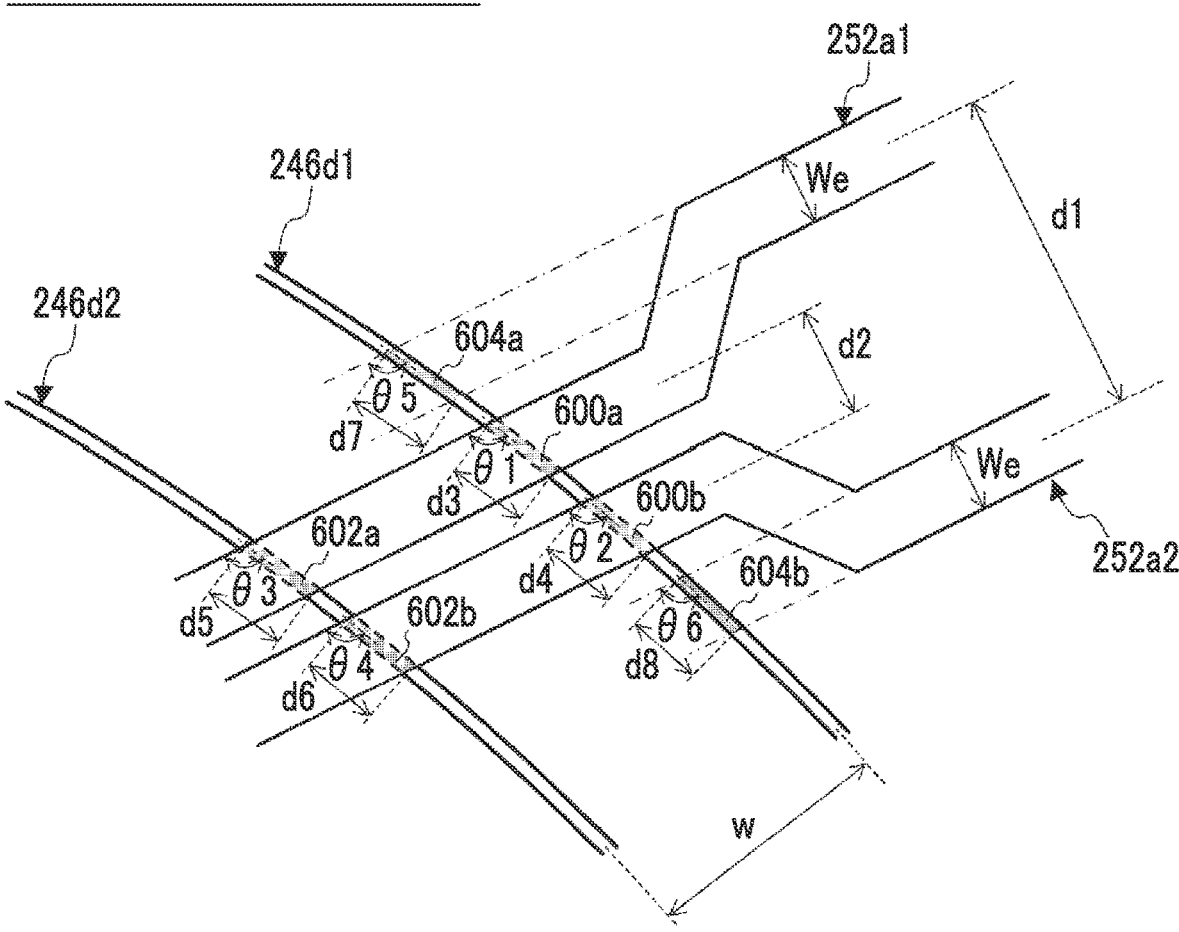
FIG. 6 is a partial detailed view of an intersection region in the optical folded part B illustrated in FIG. 4.

FIG. 6 is a partial detailed view of an intersection region 400a4 in the optical folded part B illustrated in FIG. 4. The intersection regions 400 other than the intersection region 400a4 are also configured in the same manner as the intersection region 400a4 shown in FIG. 6. In FIG. 6, the two signal lines 252a are formed with the same width We and propagate the differential signal from the upper right to the lower left in the drawing. Further, the parallel waveguides 246d propagate the light wave from the lower right to the upper left in the drawing. Then, the two signal lines 252a are formed such that the clearance d2 at the portion downstream of the portions intersecting the parallel waveguides 246d is narrower than the clearance d1 at the upstream portion along the propagation direction of the differential signal (that is, d2<d1). Here, the clearance d1 is equal to, for example, the clearance between the pads 254a and 254b.

In FIG. 6, the two signal lines 252a1 and 252a2 intersect the parallel waveguide 246d1 to form intersections 600a and 600b (hatched portions in the drawing). Further, the two signal lines 252a1 and 252a2 intersect the parallel waveguide 246d2 to form intersections 602a and 602b (hatched portions in the drawing). FIG. 6 also illustrates, for reference, virtual intersections 604a and 604b in a case where the two signal lines 252a are formed at a constant clearance d1 along the dotted chain line in the drawing and intersect the parallel waveguide 246d1.

Here, the intersection angles of the parallel waveguides 246d with respect to the signal lines 252a at the intersections 600a, 600b, 602a, and 602b are set to θ1, θ2, θ3, and θ4, respectively. Further, the intersection lengths along the parallel waveguides 246d at the intersections 600a, 600b, 602a, and 602b are d3, d4, d5, and d6, respectively. Similarly, the intersection angles at the virtual intersections 604a and 604b are set to θ5 and θ6, respectively, and the intersection lengths are set to d7 and d8, respectively. Here, the intersection angle of the parallel waveguide 246d with respect to the signal line 252a is, for example, an angle between the propagation direction of the differential signal propagating through the signal line 252a and the propagation direction of light propagating through the parallel waveguide 246d at the corresponding intersection.

As will be apparent to those skilled in the art, from a general consideration in geometry, in the parallel waveguide 246d1, the intersection angles increase in the order of θ6, θ2, θ1, and θ5. Further, the intersection lengths d3, d4, d5, d6, d7, and d8 and the intersection angles θ1, θ2, θ3, θ4, θ5, and θ6 have the following relationship with each other.

$$d3=|We/\sin \theta1|$$

$$d4=|We/\sin \theta2|$$

$$d5=|We/\sin \theta3|$$

$$d6=|We/\sin \theta4|$$

$$d7=|We/\sin \theta5|$$

$$d8=|We/\sin \theta6|$$

As described above, the two signal lines 252a are formed such that the clearance d2 at the portion downstream of the portions intersecting the parallel waveguides 246d is narrower than the clearance d1 at the upstream portion along the propagation direction of the differential signal. That is, in the two signal lines 252a, the clearance d2 at the portions intersecting the parallel waveguides 246d1 and 246d2 is narrower than the clearance d1 at the portions not intersecting the parallel waveguides 246d.

Thus, the clearance between the two intersections 600a and 600b between the two signal lines 252a and the parallel waveguide 246d1 becomes narrower than the clearance between the intersections 604a and 604b when the two signal lines 252a are formed at a constant clearance d1, and the two intersections 600a and 600b are formed close to each other.

Therefore, the intersection angles θ1 and θ2 between the signal lines 252a and the parallel waveguide 246d at the intersections 600a and 600b are substantially the same as each other (that is, θ1≈θ2). As a result, the intersection lengths d3 (=|We/sin θ1|) and d4 (=|We/sin θ2|) at the intersections 600a and 600b have substantially the same length (that is, d3≈d4).

Similarly, at the two intersections 602a and 602b of the two signal lines 252a and the parallel waveguide 246d2, the intersection angles θ5 and θ6 are substantially the same as each other (that is, θ5≈θ6), and as a result, the intersection length d7 (=|We/sin θ5|) and d8 (=|We/sin θ61) have substantially the same length as each other (that is, d7≈d8).

Therefore, in the configuration shown in FIG. 6, since the two intersections 600a and 600b of the two signal lines 252a that propagate differential signals having opposite phases to each other and the parallel waveguide 246d1 have the same intersection length (that is, d3≈d4), the disturbance modulations that occur at these two intersections 600a and 600b cancel each other out, and the disturbance modulations that occur in the entire parallel waveguide 246d1 can be effectively reduced. For the same reason, the disturbance modulations that occur at the two intersections 602a and 602b of the two signal lines 252a and the parallel waveguide 246d2 can cancel each other out, and the disturbance modulation that occurs in the entire parallel waveguides 246d2 can be reduced.

As a result, the noise of each optical signal propagating through these two parallel waveguides 246d is reduced, and the phase difference noise between these two signal lights is also reduced, so that it is possible to effectively reduce the generation of noise in the optical modulation operation of the Mach-Zehnder optical waveguide 244d configured with the parallel waveguides 246d.

Considering the clearance between general parallel waveguides of the Mach-Zehnder optical waveguide such as that used for the optical modulation device 104 and the curvature of the curved portions provided in the parallel waveguides, under a condition that the intersection angles and the intersection lengths between the intersections 600a and 600b and between the intersections 602a and 602b are substantially the same, a relationship between the clearance d2 (<d1) of the signal lines 252a at the portions intersecting the parallel waveguide 246d and the clearance w (see FIG. 6) between the two parallel waveguides 246d in the intersection portion is preferably d2≤w.

In FIG. 2, the signal lines 252a1 and 252a2 and the signal lines 252b1 and 252b2 respectively intersect the eight parallel waveguides 246 while maintaining a constant clearance between the signal lines, and extend to the optical modulator unit A. On the other hand, the signal lines 252c1 and 252c2 and the signal lines 252d1 and 252d2 respectively intersect the eight parallel waveguides 246 while maintaining a constant clearance between the signal lines, and then extend to the optical modulator unit A while clearances therebetween are widened. The configuration of the signal lines 252c and 252d is advantageous from the viewpoint of reducing crosstalk between the signal lines propagating the differential signal.

However, the above configuration is an example, and for example, in a case where the crosstalk does not have a large influence, one or both of the signal lines 252c and 252d can be formed to extend to the optical modulator unit A while maintaining a constant clearance between the signal lines propagating the differential signal in the same manner as the signal lines 252a and 252b. Alternatively, when the influence of crosstalk cannot be ignored, one or both of the signal lines 252a and 252b can be formed to extend to the optical modulator unit A while the clearance between the signal lines propagating the differential signal is widened, in the same manner as the signal lines 252c and 252d.

Next, a modification example of the configuration of the optical modulation device 104 in the intersection region 400 will be described.

1.1 First Modification Example

Figure 7:
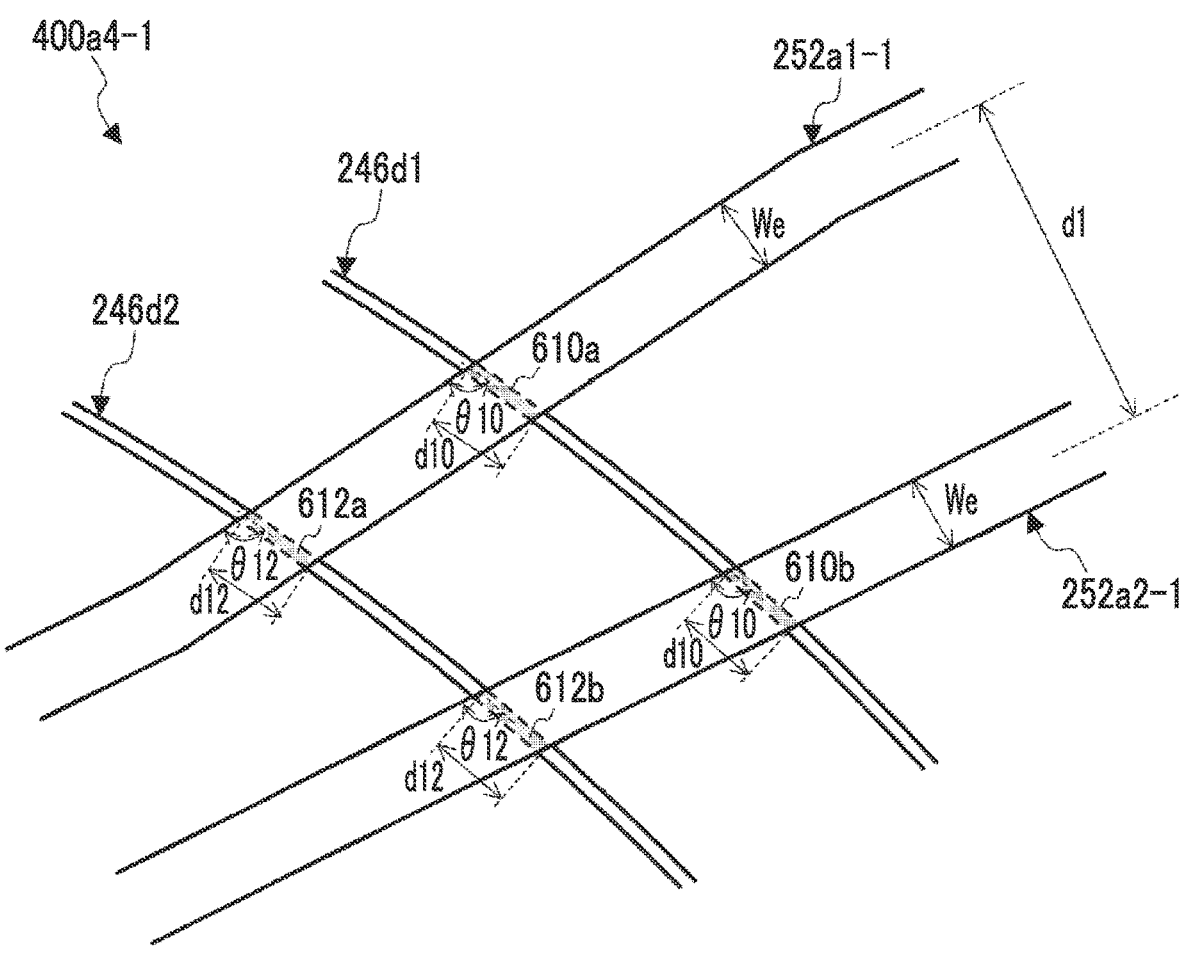
FIG. 7 is a diagram illustrating a configuration of an intersection region according to a first modification example.

FIG. 7 is a diagram showing the configuration of the intersection region 400a4-1 according to the first modification example of the intersection region 400a4 shown in FIG. 6. The configuration of the intersection region 400a4-1 shown in FIG. 7 can be used instead of the configuration of the intersection region 400a4 shown in FIG. 6, in the optical modulation device 104. Further, as is apparent to those skilled in the art, the same configuration as the intersection region 400a4-1 can be used for the intersection regions 400 other than the intersection region 400a4 in FIG. 4. In FIG. 7, the same reference numerals as those in FIG. 6 are used to denote the same configuration elements illustrated in FIG. 6, description in FIG. 6 described above will be incorporated by reference.

In the intersection region 400a4-1, signal lines 252a1-1 and 252a2-1 are used instead of the signal lines 252a1 and 252a2. The signal lines 252a1-1 and 252a2-1 have the same configuration as the signal lines 252a1 and 252a2, but the mode of intersection with the parallel waveguide 246d is different from that of the signal lines 252a1 and 252a2. Hereinafter, the signal lines 252a1-1 and 252a2-1 will be collectively referred to as signal lines 252a-1.

That is, in the signal lines 252a shown in FIG. 6, the signal lines 252a1 and 252a2 are formed close to each other in parallel at portions intersecting the parallel waveguides 246d, whereas in the signal lines 252a-1 shown in FIG. 7, one signal line 252a1-2 is inclined with respect to the other signal line a2-1 such that the two signal lines 252a1-1 and 252a2-1 intersect the parallel waveguides 246d at the same intersection angle $\theta 10$. Thus, the intersections $610a$ and $610b$ have the same intersection length d10 ($=$|We/sin $\theta 10$|).

Similarly, the two intersections $612a$ and $612b$ between the parallel waveguide $246d2$ and the signal lines $252a1$-1 and $252a2$-1 intersect at the same intersection angle $\theta 12$ as the two signal lines $252a$-1. Thus, the intersections $612a$ and $612b$ have the same intersection length d12 ($=$|We/sin $\theta 12$|).

Therefore, also in the configuration of the intersection region $400a4$-1, in the parallel waveguide $246d1$, the disturbance modulations generated at the two intersections $610a$ and $610b$ cancel each other out, similar to the configuration of the intersection region $400a4$ shown in FIG. 6. Similarly, in the parallel waveguide $246d2$, the disturbance modulations that occur at the two intersections $612a$ and $612b$ cancel each other out. As a result, the generation of noise due to the disturbance modulation in the Mach-Zehnder optical waveguide $244d$ is effectively reduced.

1.2 Second Modification Example

Figure 8:
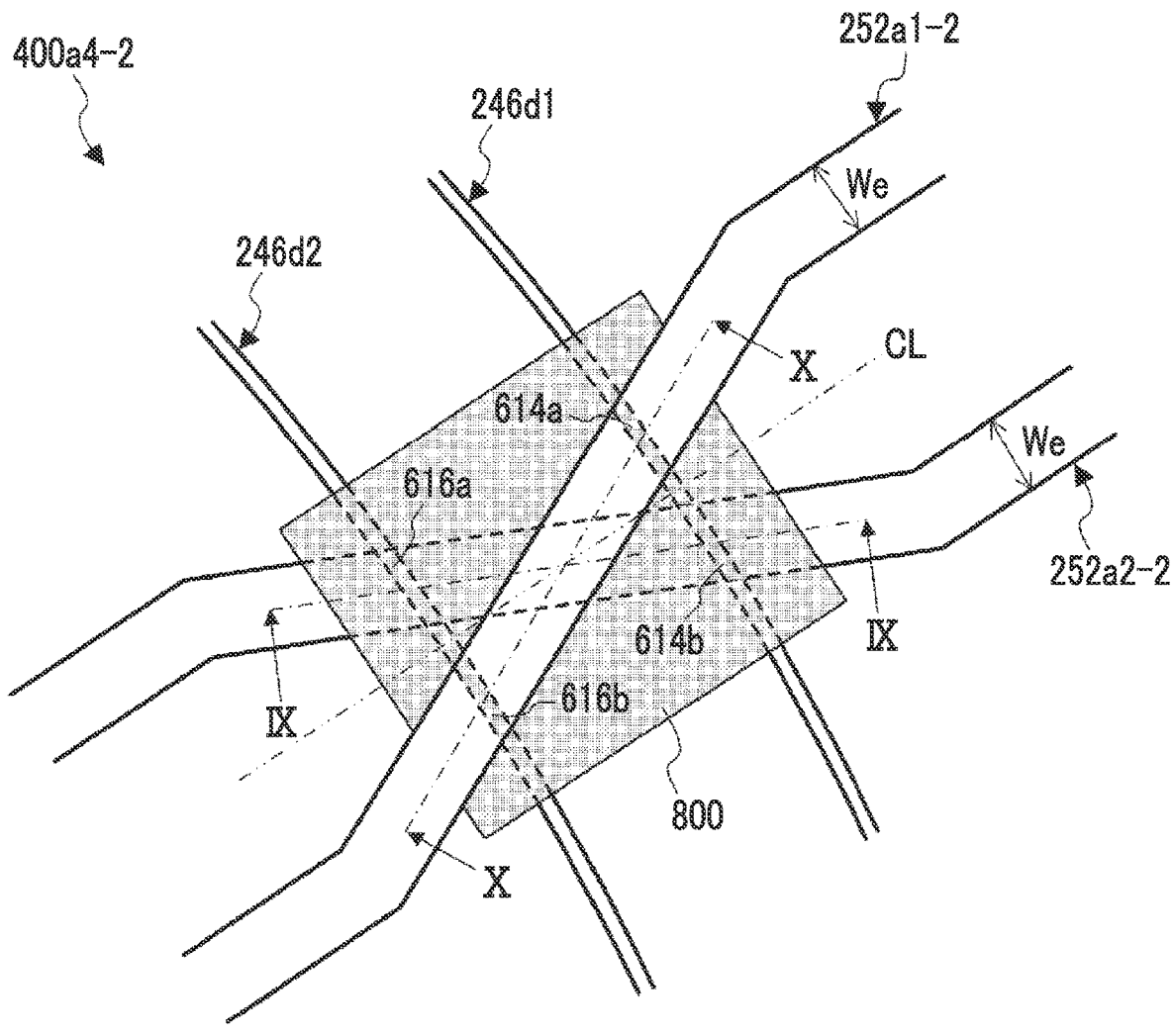
FIG. 8 is a diagram illustrating a configuration of an intersection region according to a second modification example.

FIG. 8 is a diagram showing the configuration of the intersection region $400a4$-2 according to the second modification example of the intersection region $400a4$ shown in FIG. 6. The configuration of the intersection region $400a4$-2 shown in FIG. 8 can be used instead of the configuration of the intersection region $400a4$ shown in FIG. 6, in the optical modulation device 104. Further, as is apparent to those skilled in the art, the same configuration as the intersection region $400a4$-2 can be used for the intersection regions 400 other than the intersection region $400a4$ in FIG. 4. In FIG. 8, the same reference numerals as those in FIG. 6 are used to denote the same configuration elements illustrated in FIG. 6, description in FIG. 6 described above will be incorporated by reference.

In the intersection region $400a4$-2, signal lines $252a1$-2 and $252a2$-2 are used instead of the signal lines $252a1$ and $252a2$. The signal lines $252a1$-2 and $252a2$-2 have the same configuration as the signal lines $252a1$ and $252a2$, but the mode of intersection with the parallel waveguide $246d$ is different from that of the signal lines $252a1$ and $252a2$. Hereinafter, the signal lines $252a1$-2 and $252a2$-2 are collectively referred to as signal lines $252a$-2.

That is, in the signal lines $252a$ shown in FIG. 6, the signal lines $252a1$ and $252a2$ are formed close to each other in parallel at portions intersecting the two parallel waveguides $246d$, whereas in the signal lines $252a$-2 shown in FIG. 8, the two signal lines $252a1$-2 and $252a2$-2 intersect each other in a region on the substrate 220 sandwiched between the two parallel waveguides $246d$. As a result, the intersection lengths of the two intersections $614a$ and $614b$ of the two signal lines $252a$-2 and the parallel waveguide $246d1$ are formed to be the same length as each other, and the intersection lengths of the two intersections $616a$ and $616b$ of the two signal lines $252a$-2 and the parallel waveguide $246d2$ are formed to be the same length as each other.

Here, from the viewpoint of making the intersection lengths the same between the intersections $614a$ and $614b$ and between the intersections $616a$ and $616b$, it is desirable that the signal lines $252a1$-2 and $252a2$-2 are formed symmetrically with respect to the line segment CL (two-dot chain line in the drawing) orthogonal to the two parallel waveguides $246d$.

In a portion where the two signal lines $252a$-2 intersect the parallel waveguide $246d$, an electrically insulating resin layer 800 is formed such that the signal lines $252a$-2 do not come into contact with each other. The resin configuring the resin layer 800 is, for example, a photoresist, which is a so-called photosensitive permanent film containing a coupling agent (cross-linking agent) and in which the cross-linking reaction proceeds by heat and is cured.

Figure 9:
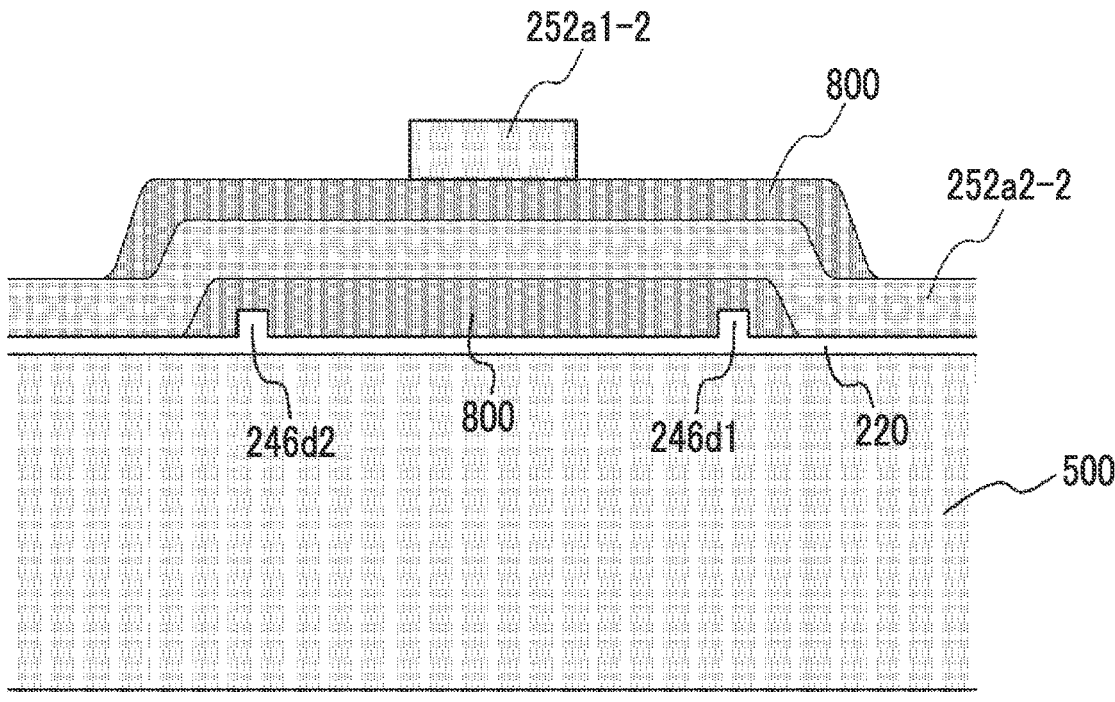
FIG. 9 is a cross-sectional view taken along line IX-IX of the intersection region shown in FIG. 8.
Figure 10:
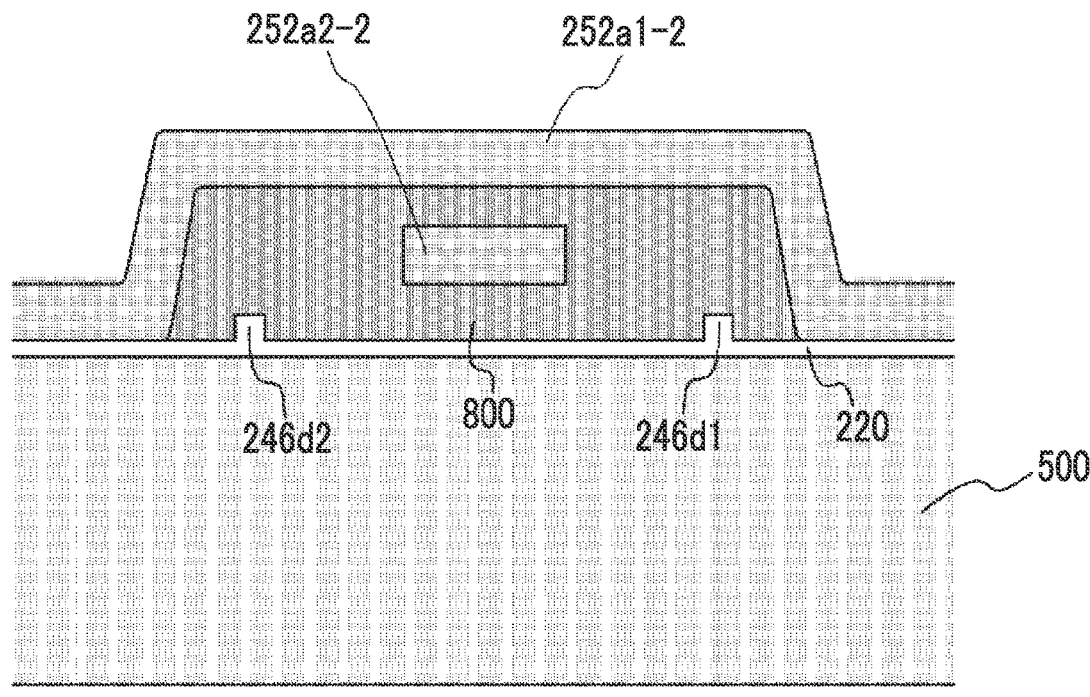
FIG. 10 is a cross-sectional view taken along line X-X of the intersection region shown in FIG. 8.

FIG. 9 is a cross-sectional view taken along line IX-IX in the intersection region $400a4$-2 shown in FIG. 8, and FIG. 10 is a cross-sectional view taken along line X-X in the intersection region $400a4$-2 shown in FIG. 8. As shown in FIGS. 9 and 10, in the present embodiment, the resin layer 800 is formed between the parallel waveguides $246d$ and the signal line $252a2$-2 and between the signal lines $252a2$-2 and $252a1$-2.

1.3 Third Modification Example

Figure 11:
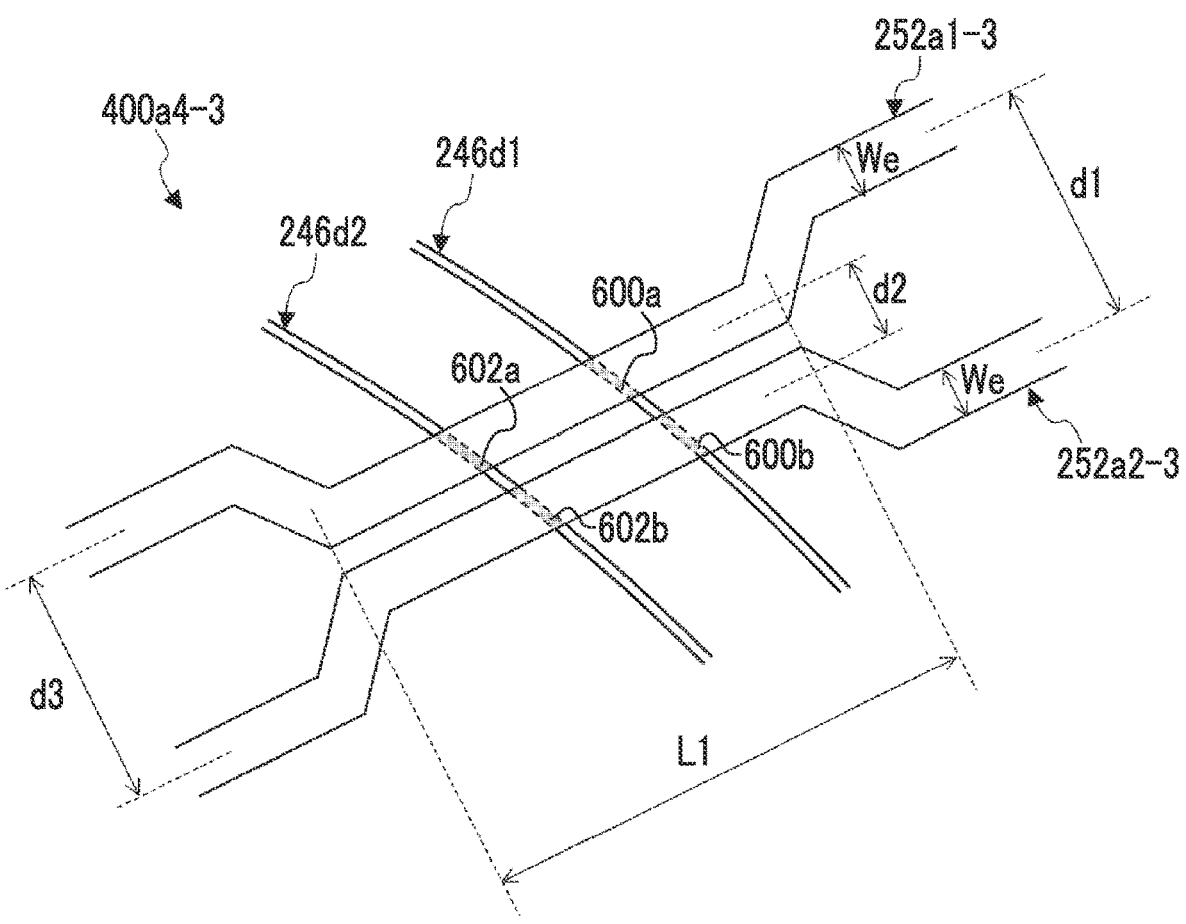
FIG. 11 is a diagram illustrating a configuration of an intersection region according to a third modification example.

FIG. 11 is a diagram showing the configuration of the intersection region $400a4$-3 according to the third modification example of the intersection region $400a4$ shown in FIG. 6. The configuration of the intersection region $400a4$-3 shown in FIG. 11 can be used instead of the configuration of the intersection region $400a4$ shown in FIG. 6, in the optical modulation device 104. Further, as is apparent to those skilled in the art, the same configuration as the intersection region $400a4$-3 can be used for the intersection regions 400 other than the intersection region $400a4$ in FIG. 4. In FIG. 11, the same reference numerals as those in FIG. 6 are used to denote the same configuration elements illustrated in FIG. 6, description in FIG. 6 described above will be incorporated by reference.

In the intersection region $400a4$-3, signal lines $252a1$-3 and $252a2$-3 are used instead of the signal lines $252a1$ and $252a2$. The signal lines $252a1$-3 and $252a2$-3 have the same configuration as the signal lines $252a1$ and $252a2$, but further, are formed such that the clearance d3 of the portion downstream of the portions intersecting the parallel waveguides $246d$ along the propagation direction of the differential signal is wider than the clearance d2 of the intersecting portions. Here, the clearance d3 can be selected, for example, in the range $d2 < d3 \le d1$. Hereinafter, the signal lines $252a1$-3 and $252a2$-3 will be collectively referred to as signal lines $252a$-3.

The configuration of the intersection region $400a4$ shown in FIG. 6 is the simplest means for reducing the disturbance modulation generated at the intersection $600a$ or the like of the two curved parallel waveguides $246d$, and particularly, is effective when there are a plurality of such intersections in each of the two signal lines $252a$. However, on the other hand, when the two signal lines $252a$ are brought close to each other, a new problem may occur in which crosstalk occurs between differential signals that are high-frequency signals propagating through these signal lines $252a$.

On the other hand, in the configuration of the intersection region $400a4$-3 shown in FIG. 11, since the two signal lines $252a$-3 are configured such that the clearances d1 and d3 at the portions upstream and downstream of the intersecting portion along the propagation direction of the differential signal are wider than the clearance d2 at the portions intersecting the parallel waveguide $246d$, the length of the portion where the two signal lines $252a$ are provided close to each other at the clearance d2 is reduced, and the generation amount of the above crosstalk can be reduced.

In FIG. 11, the length L1 of the section where the two signal lines $252a$ are provided close to each other at the clearance d2 (or, when there are a plurality of sections where the two signal lines $252a$ are provided close to each other at the clearance d2, the sum of the lengths L1 of these plurality of sections) is preferably shorter than the wavelength (the wavelength of the central electric signal) at the center frequency of the differential high-frequency signal propagating through the two signal lines 252a, from the viewpoint of crosstalk reduction. For example, the wavelength is 6 mm when the center frequency is 50 GHz, 3 mm when the center frequency is 100 GHz, 1.5 mm when the center frequency is 200 GHz, and about 750 μm when the center frequency is 400 GHz.

1.4 Fourth Modification Example

Figure 12:
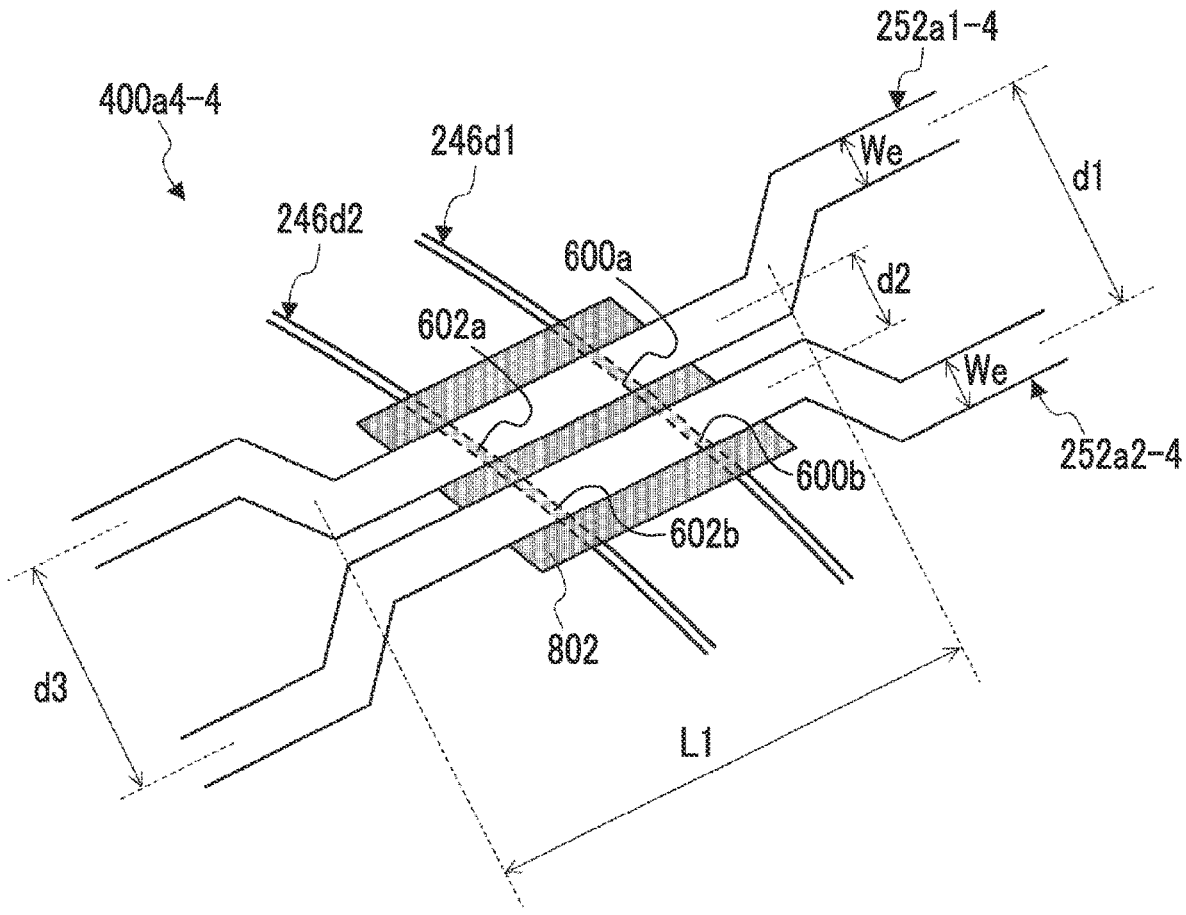
FIG. 12 is a diagram illustrating a configuration of an intersection region according to a fourth modification example.

FIG. 12 is a diagram showing the configuration of the intersection region 400a4-4 according to the fourth modification example of the intersection region 400a4 shown in FIG. 6. The configuration of the intersection region 400a4-4 shown in FIG. 12 can be used instead of the configuration of the intersection region 400a4 shown in FIG. 6, in the optical modulation device 104. Further, as is apparent to those skilled in the art, the same configuration as the intersection region 400a4-4 can be used for the intersection regions 400 other than the intersection region 400a4 in FIG. 4. In FIG. 12, the same reference numerals as those in FIGS. 6 and 11 are used to denote the same configuration elements illustrated in FIGS. 6 and 11, description in FIGS. 6 and 11 described above will be incorporated by reference.

The intersection region 400a4-4 has the same configuration as the intersection region 400a4-3, but the resin layer 802 is formed between the parallel waveguides 246d1 and 246d2 and the signal lines 252a1-3 and 252a2-3. The resin configuring the resin layer 802 may be, for example, the above-described photosensitive permanent film.

In the configuration of the intersection region 400a4-4, the resin layer 802 weakens the electric field applied to the parallel waveguides 246d1 and 246d2 from the two signal lines 252a1-3 and 252a2-3, so that the disturbance modulation generated in the parallel waveguides 246d1 and 246d2 can be further reduced, as compared with the configuration shown in the intersection region 400a3-4 shown in FIG. 11.

1.5 Fifth Modification Example

Figure 13:
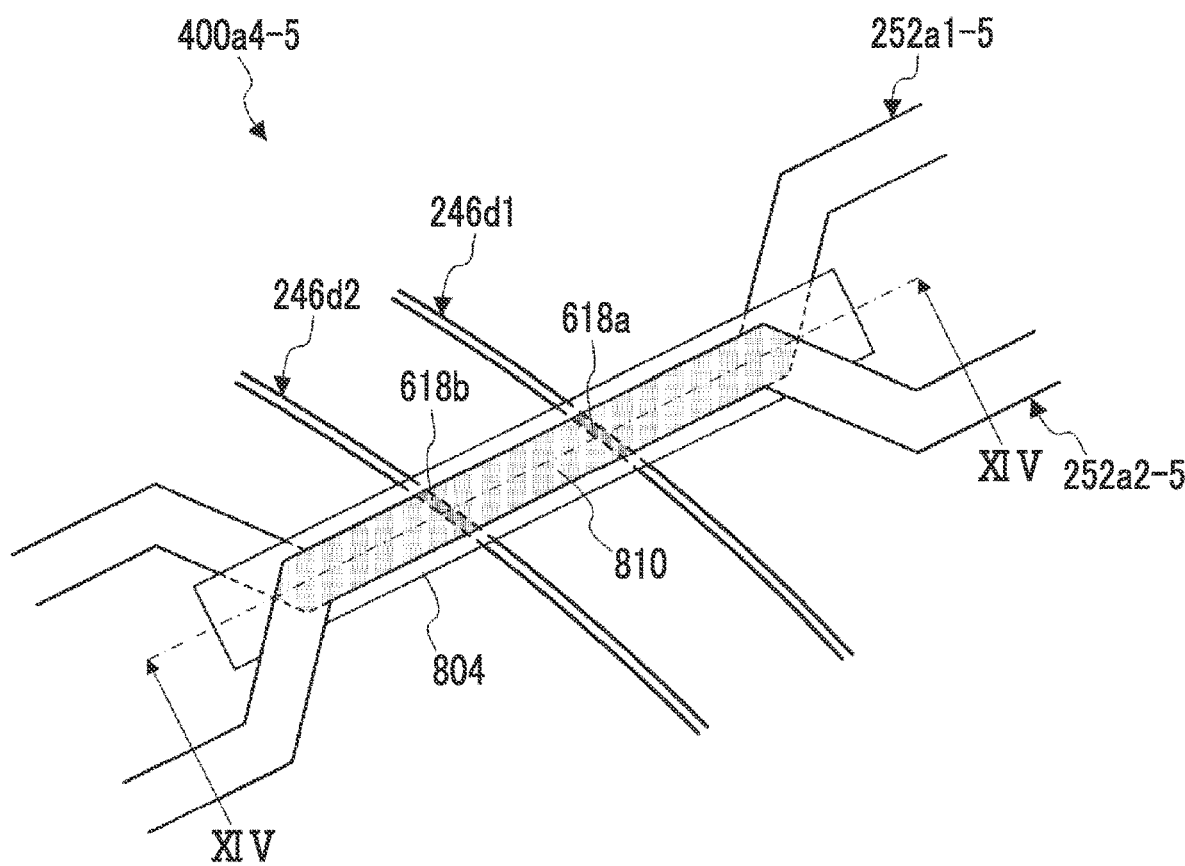
FIG. 13 is a diagram illustrating a configuration of an intersection region according to a fifth modification example.

FIG. 13 is a diagram showing the configuration of the intersection region 400a4-5 according to the fifth modification example of the intersection region 400a4 shown in FIG. 6. The configuration of the intersection region 400a4-5 shown in FIG. 13 can be used instead of the configuration of the intersection region 400a4 shown in FIG. 6, in the optical modulation device 104. Further, as is apparent to those skilled in the art, the same configuration as the intersection region 400a4-5 can be used for the intersection regions 400 other than the intersection region 400a4 in FIG. 4. In FIG. 13, the same reference numerals as those in FIGS. 6 and 12 are used to denote the same configuration elements illustrated in FIGS. 6 and 11, description in FIGS. 6 and 12 described above will be incorporated by reference.

The intersection region 400a4-5 has the same configuration as the intersection region 400a4, but the signal lines 252a1-5 and 252a2-5 are used instead of the signal lines 252a1 and 252a2. Hereinafter, the signal lines 252a1-5 and 252a2-5 will be collectively referred to as signal lines 252a-5.

The signal lines 252a1-5 and 252a2-5 have the same configuration as the signal lines 252a1-3 and 252a2-3 in the intersection region 400a-4 shown in FIG. 12, but the difference is that there is a multilayer portion 810 (hatched portions in the drawing) in which the portions intersecting the parallel waveguide 246d are overlapped each other in plan view of the substrate 220.

Thus, in the multilayer portion 810, the intersection of the signal line 252a1-5 and the parallel waveguide 246d1 and the intersection of the signal line 252a1-5 and the parallel waveguide 246d1 become one intersection 618a and have the same intersection length, and the intersection of the signal line 252a2-5 and the parallel waveguide 246d2 and the intersection of the signal line 252a2-5 and the parallel waveguide 246d2 become one intersection 618B and have the same intersection length.

Figure 14:
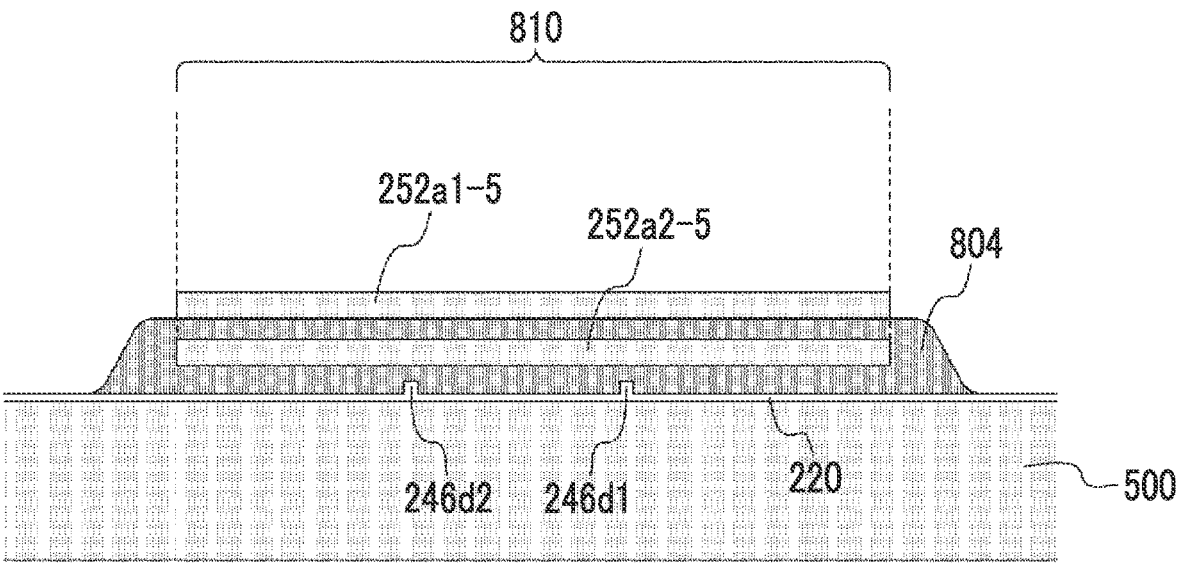
FIG. 14 is a cross-sectional view taken along line XIV-XIV of the intersection region shown in FIG. 13.

Further, in the intersection region 400a4-5, the same resin layer 804 as the resin layer 802 shown in FIG. 13 is provided such that the signal lines 252a1-5 and 252a2-5 do not come into contact with each other in the multilayer portion 810. FIG. 14 is a cross-sectional view taken along line XIV-XIV of the intersection region 400a4-5 shown in FIG. 13. In the present embodiment, the resin layer 804 is provided such that the parallel waveguides 246d1 and 246d2, the signal line 252a2-5, and the signal line 252a1-5 are not in contact with each other. Similar to the resin layer 802, the resin layer 804 may be, for example, a photosensitive permanent film.

Thus, in the multilayer portion 810, the electric fields from the two signal lines 252a1-5 and 252a2-5 that transmit the differential signal cancel each other out at the positions of the two parallel waveguides 246d.

That is, in the configuration of the intersection region 400a4-5, since the effect of canceling the electric field between the two signal lines 252a-5 is also added, the disturbance modulation that occurs at the intersections 618a and 618b can be further reduced, as compared with the configuration of the intersection region 400a4 in which the two signal lines 252a as shown in FIG. 6 are disposed close to each other and the configuration in which the two signal lines 252a-2 as shown in FIG. 8 intersect.

The configuration of the intersection region 400a4-5 is particularly suitable when it is desired to increase the effect of reducing disturbance modulation or when it is desired to narrow the formation region of the two signal lines 252a-5 at the portions intersecting the parallel waveguide 246d.

2. Second Embodiment

Figure 15:
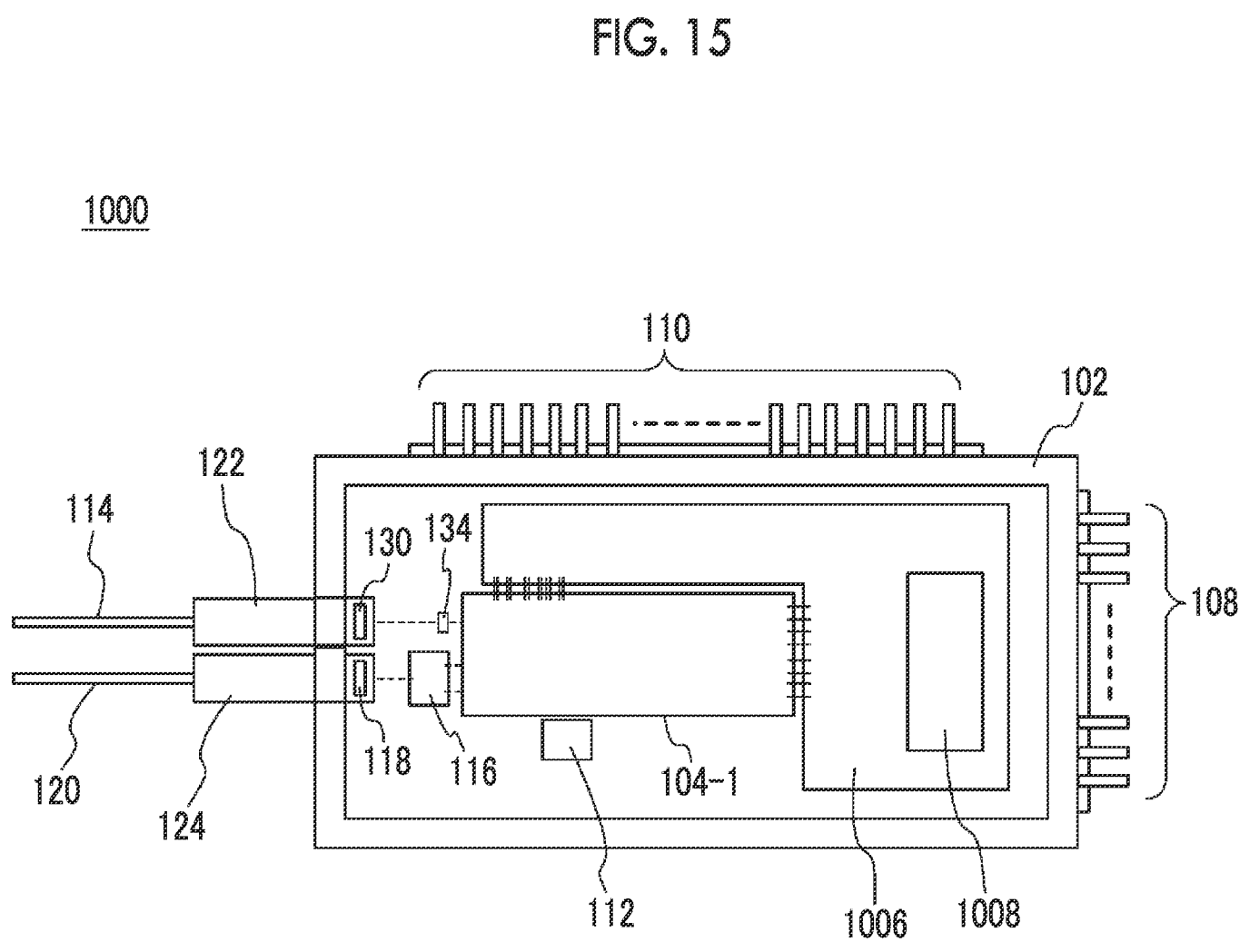

Next, a second embodiment of the present invention will be described. The present embodiment is an optical modulation module 1000 using the optical modulation device 104 included in the optical modulator 100 according to the first embodiment. FIG. 15 is a diagram showing the configuration of an optical modulation module 1000 according to the present embodiment. In FIG. 15, the same configuration elements as in the optical modulator 100 according to the first embodiment illustrated in FIG. 1 are shown using the same reference numerals as the reference numerals shown in FIG. 1, and the description of FIG. 1 incorporated herein.

The optical modulation module 1000 has the same configuration as the configuration of the optical modulator 100 illustrated in FIG. 1, but differs from the optical modulator 100 in that a circuit substrate 1006 is provided instead of the relay substrate 106. The circuit substrate 1006 includes a drive circuit 1008. The drive circuit 1008 generates a differential signal, which is a high-frequency electrical signal for driving the optical modulation device 104 based on, for example, a modulation signal supplied from the outside via the signal pins 108, and outputs the generated differential signal to the optical modulation device 104.

Since the optical modulation module 1000 having the above configuration includes the optical modulation device 104 similar to the optical modulator 100 according to the first embodiment described above, disturbance modulation generated at the intersection 600*a* or the like can be reduced to achieve good modulation operation, similar to the optical modulator 100.

In the present embodiment, the optical modulation module 1000 includes the optical modulation device 104 as an example, but may include the optical modulation device having the intersection region according to the modification example shown in FIGS. 7 to 14.

3. Third Embodiment

Figure 16:
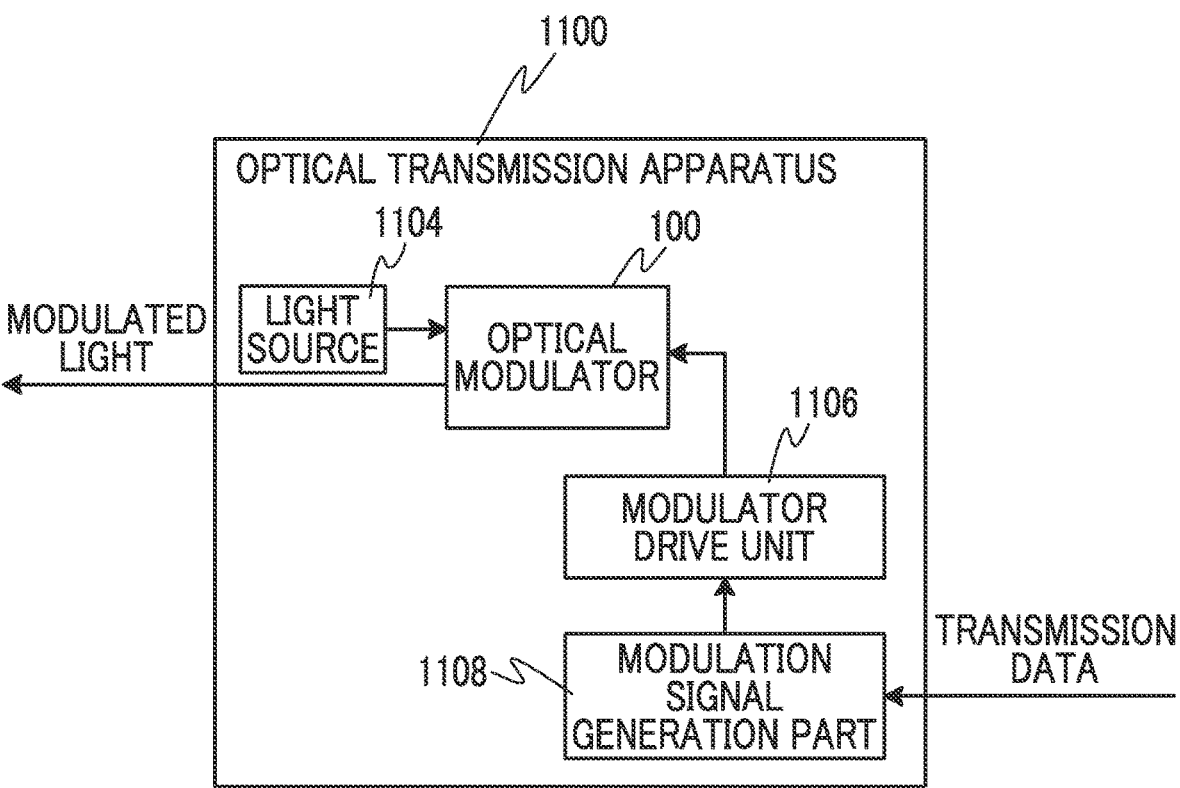
FIG. 16 is a diagram illustrating a configuration of an optical transmission apparatus according to a third embodiment of the present invention.

Next, a third embodiment of the present invention will be described. The present embodiment is an optical transmission apparatus 1100 equipped with the optical modulator 100 according to the first embodiment. FIG. 16 is a diagram showing a configuration of an optical transmission apparatus 1100 according to the present embodiment. The optical transmission apparatus 1100 includes an optical modulator 100, a light source 1104 that inputs light to the optical modulator 100, a modulator drive unit 1106, and a modulation signal generation part 1108. The optical modulation module 1000 according to the second embodiment can also be used instead of the optical modulator 100 and the modulator drive unit 1106.

The modulation signal generation part 1108 is an electronic circuit that generates an electrical signal for causing the optical modulator 100 to perform a modulation operation, which generates, based on transmission data given from the outside, a modulation signal which is a high-frequency signal for causing the optical modulator 100 to perform an optical modulation operation according to the modulation data, and outputs the modulation signal to the modulator drive unit 1106.

The modulator drive unit 1106 amplifies the modulation signal input from the modulation signal generation part 1108 and outputs the differential signal which is four sets of high-frequency electrical signals for driving four signal electrodes 250 of the optical modulation device 104 included in the optical modulator 100. As described above, instead of the optical modulator 100 and the modulator drive unit 1106, for example, the optical modulation module 1000 provided with a drive circuit 1008 including a circuit corresponding to the modulator drive unit 1106 inside the housing 102 can also be used.

The four sets of differential signals are input to the signal pins 108 of the optical modulator 100 and propagate through the four sets of signal lines 252 (that is, the signal lines 252*a*, 252*b*, 252*c*, and 252*d*) of the optical modulation device 104 to drive the optical modulation device 104. Thus, the light output from the light source 1104 is, for example, DP-QPSK modulated by the optical modulator 100 to become modulated light, and is output from the optical transmission apparatus 1100.

In particular, in the optical transmission apparatus 1100, since the optical modulator 100 or the optical modulation module 1000 according to the first embodiment described above is used, similar to the optical modulator 100 or the optical modulation module 1000, good modulation characteristics can be achieved, and good optical transmission can be performed.

The present invention is not limited to the configuration of the above embodiment and its alternative configuration, and can be implemented in various embodiments without departing from the gist thereof.

For example, in the above-described embodiments, the photosensitive permanent films are used as the resin layers 800 and 802, but the materials configuring the resin layers

800 and 802 are not limited to the photosensitive permanent films. Any material can be used for the resin layers 800 and 802 as long as the requirements for electrical characteristics such as insulation resistance and mechanical characteristics such as thermal expansion coefficient are satisfied. Such materials may include a thermosetting or thermoplastic resin other than the photosensitive permanent film.

Further, in a case where the signal line 252 is formed in contact with the optical waveguide 230, a loss (so-called optical absorption loss) may occur in the light wave propagating through the optical waveguide 230 due to the metal configuring the signal line 252. Therefore, in a portion where the signal line 252 intersects the optical waveguide 230 (including the parallel waveguide 246), a resin layer similar to the resin layers 800, 802, and/or 804 may be provided between the signal line 252 and the optical waveguide 230. For example, even in the intersection region 400*a*4 shown in FIG. 6, the intersection region 400*a*4-1 shown in FIG. 7, the intersection region 400*a*4-3 shown in FIG. 11, and other intersection regions 400 configured in the same manner as these intersection regions, a resin layer similar to the resin layer 800 in the intersection region 400*a*4-2 shown in FIG. 8, the resin layer 802 in the intersection region 400*a*4-4 shown in FIG. 12, and/or the resin layer 804 in the intersection region 400*a*-5 shown in FIG. 13 can be provided between corresponding signal line and the parallel waveguide.

Further, in the first embodiment and the modification examples described above, the 16 intersection regions 400 shown in FIG. 4 have the same configuration, but these intersection regions 400 have a plurality of configurations mixed. That is, these 16 intersection regions 400 may be configured such that a plurality of configurations among the configurations showing the intersection regions 400*a*4, 400*a*4-1, 400*a*4-2, 400*a*-3, 400*a*4-4, and 400*a*4-5 shown in FIG. 6, FIG. 7, FIG. 8, FIG. 11, FIG. 12, and FIG. 13 are mixed.

Further, in the above-described embodiments, as an example of the optical waveguide device, the optical modulation device 104 formed of the substrate 220 of LN (LiNbO$_3$) is shown, but without being limited to this, the optical waveguide device can be a device having any function (in addition to optical modulation, optical switch, optical directional coupler, or the like), which is formed of a substrate of any material (in addition to LN, InP, Si, or the like). Such devices may be, for example, so-called silicon photonics waveguide devices.

The above embodiments support the following configurations.

(Configuration 1) An optical waveguide device including: an optical waveguide composed of a protruding portion extending on a substrate; and a signal electrode that is formed on the substrate and controls light waves propagating through the optical waveguide, in which the optical waveguide includes a Mach-Zehnder optical waveguide including two parallel waveguides having curved portions, the signal electrode includes two signal lines for transmitting a differential signal, each intersecting the two parallel waveguides at the curved portions, and each of the two signal lines is configured such that intersection lengths on the two parallel waveguides are the same as each other.

According to the optical waveguide device of Configuration 1, in an optical waveguide device having a plurality of intersections between a convex optical waveguide and a signal line propagating an electrical signal, the occurrence of disturbance modulation at the intersections is effectively reduced, thereby achieving good operating characteristics.

(Configuration 2) The optical waveguide device according to Configuration 1, in which in the two signal lines, a clearance in portions intersecting the parallel waveguide is narrower than a clearance in portions not intersecting the parallel waveguide.

According to the optical waveguide device of Configuration 2, in the curved portions of the two parallel waveguides, the intersection lengths of the two intersections of the two signal lines in each of the two parallel waveguides can be easily configured to be the same as each other.

(Configuration 3) The optical waveguide device according to Configuration 2, in which in the two signal lines, the clearance in the portions intersecting the parallel waveguide is narrower than a clearance in portions upstream of the portions intersecting the parallel waveguide along a propagation direction of the differential signal.

According to the optical waveguide device of Configuration 3, two signal lines intersecting the parallel waveguide can be easily brought close to each other, and the intersection lengths of the two intersections in the parallel waveguide can be configured to be the same as each other.

(Configuration 4) The optical waveguide device according to Configuration 3, in which in the two signal lines, a clearance in portions downstream of the portions intersecting the parallel waveguide along the propagation direction of the differential signal is wider than the clearance in the portions intersecting the parallel waveguide.

According to the optical waveguide device of Configuration 4, it is possible to reduce crosstalk between two signal lines formed close to each other at the intersection with the parallel waveguide.

(Configuration 5) The optical waveguide device according to Configuration 1, in which the two signal lines each are formed such that intersection angles with the two parallel waveguides are the same as each other.

According to the optical waveguide device of Configuration 5, in the curved portions of the two parallel waveguides, the intersection lengths of the two intersections of the two signal lines in each of the two parallel waveguides can be easily configured to be the same as each other.

(Configuration 6) The optical waveguide device according to Configuration 5, in which the two signal lines intersect each other in a region on the substrate sandwiched between the two parallel waveguides.

According to the optical waveguide device of Configuration 6, in the curved portions of the two parallel waveguides, the intersection lengths of the two intersections of the two signal lines in each of the two parallel waveguides can be easily configured to be the same as each other.

(Configuration 7) The optical waveguide device according to Configuration 1, in which in the two signal lines, portions intersecting the parallel waveguide overlap each other in plan view of the substrate.

According to the optical waveguide device of Configuration 7, in the curved portions of the two parallel waveguides, the intersection lengths of the two intersections of the two signal lines in each of the two parallel waveguides can be easily configured to be the same as each other, and the disturbance modulation can be reduced more effectively.

(Configuration 8) The optical waveguide device according to any one of Configurations 2 to 7, in which an insulating layer made of resin is provided between the parallel waveguide and the two signal lines at portions where the two signal lines intersect the parallel waveguide.

According to the optical waveguide device of Configuration 8, it is possible to reduce the optical absorption loss generated in the parallel waveguide due to the metal of the signal line intersecting the parallel waveguide.

(Configuration 9) An optical modulator including: the optical waveguide device according to any one of Configurations 1 to 7, which is an optical modulation device that modulates light; a housing that houses the optical waveguide device; an optical fiber that inputs light to the optical waveguide device; and an optical fiber that guides light output by the optical waveguide device to outside the housing.

According to the optical modulator of Configuration 9, it is possible to achieve good optical modulation characteristics by reducing the occurrence of disturbance modulation.

(Configuration 10) An optical modulation module including: the optical waveguide device according to any one of Configurations 1 to 7, which is an optical modulation device that modulates light; and a drive circuit that drives the optical waveguide device.

According to the optical modulation module of Configuration 10, it is possible to achieve good optical modulation characteristics by reducing the occurrence of disturbance modulation.

(Configuration 11) An optical transmission apparatus including: the optical modulator described in Configuration 9 or the optical modulation module described in Configuration 10, and an electronic circuit that generates an electrical signal for causing the optical waveguide device to perform a modulation operation.

According to the optical transmission apparatus of Configuration 11, good optical transmission characteristics can be achieved.

REFERENCE SIGNS LIST

100 Optical modulator
102 Housing
104 Optical modulation device
106 Relay substrate
108, 110 Signal pin
112 Terminator
114 Input optical fiber
116 Optical unit
118, 130, 134 Lens
120 Output optical fiber
122, 124 Support
220 Substrate
230 Optical waveguide
232 Input waveguide
234 Branched waveguide
240, 240a, 240b Nested Mach-Zehnder optical waveguide
244, 244a, 244b, 244c, 244d Mach-Zehnder optical waveguide
246, 246a, 246a1, 246a2, 246b, 246b1, 246b2, 246c, 246c1, 246c2, 246d, 246d1, 246d2 Parallel waveguide
248a, 248b Output waveguide
250a, 250b, 250c, 250d Signal electrode
252, 252a, 252a1, 252a2, 252a-1, 252a1-1, 252a2-1, 252a-2, 252a1-2, 252a2-2, 252a-3, 252a1-3, 252a2-3, 252a-4, 252a1-4, 252a2-4, 252a-5, 252a1-5, 252a2-5, 252a1-5, 252a2-5, 252b, 252b1, 252b2, 252c, 252c1, 252c2, 252d, 252d1, 252d2 Signal line
254a, 254b, 254c, 254d, 254e, 254f, 254g, 254h, 258a, 258b, 258c, 258d, 258e, 258f, 258g, 258h Pad
270a, 270b, 270c Bias electrode
272 Ground electrode
280a, 280b, 280c, 280d Side
300, 300a, 300b, 300c, 300d Action portion

400, 400*a*, 400*a*1, 400*a*2, 400*a*3, 400*a*4, 400*a*4-1, 400*a*4-2, 400*a*4-3, 400*a*4-4, 400*a*4-5, 400*b*, 400*b*1, 400*b*2, 400*b*3, 400*b*4, 400*c*, 400*c*1, 400*c*2, 400*c*3, 400*c*4, 400*d*, 400*d*1, 400*d*2, 400*d*3, 400*d*4 Intersection region
500 Supporting plate
502 Intermediate layer
504, 504*c*1, 504*c*2 Protruding portion
600*a*, 600*b*, 602*a*, 602*b*, 604*a*, 604*b*, 610*a*, 610*b*, 612*a*, 612*b*, 614*a*, 614*b*, 616*a*, 616*b*, 618*a*, 618*b* Intersection
800, 802, 804 Resin layer
810 Multilayer portion
1000 Optical modulation module
1006 Circuit substrate
1008 Drive circuit
1100 Optical transmission apparatus
1104 Light source
1106 Modulator drive unit
1108 Modulation signal generation part

The invention claimed is:

1. An optical waveguide device comprising:
an optical waveguide composed of a protruding portion extending on a substrate; and
a signal electrode that is formed on the substrate and controls light waves propagating through the optical waveguide, wherein
the optical waveguide includes a Mach-Zehnder optical waveguide including two parallel waveguides having curved portions,
the signal electrode includes two signal lines for transmitting a differential signal, each intersecting the two parallel waveguides at the curved portions, and
each of the two parallel waveguides is configured such that intersection lengths with the two signal lines for transmitting the differential signal are the same as each other.

2. The optical waveguide device according to claim 1, wherein
in the two signal lines, a clearance in portions intersecting the parallel waveguide is narrower than a clearance in portions not intersecting the parallel waveguide.

3. The optical waveguide device according to claim 2, wherein
in the two signal lines, the clearance in the portions intersecting the parallel waveguide is narrower than a clearance in portions upstream of the portions intersecting the parallel waveguide along a propagation direction of the differential signal.

4. The optical waveguide device according to claim 3, wherein
in the two signal lines, a clearance in portions downstream of the portions intersecting the parallel waveguide along the propagation direction of the differential signal is wider than the clearance in the portions intersecting the parallel waveguide.

5. The optical waveguide device according to claim 2, wherein
an insulating layer made of resin is provided between the parallel waveguide and the two signal lines at portions where the two signal lines intersect the parallel waveguide.

6. The optical waveguide device according to claim 1, wherein
the two signal lines each are formed such that intersection angles with the two parallel waveguides are the same as each other.

7. The optical waveguide device according to claim 6, wherein
the two signal lines intersect each other in a region on the substrate sandwiched between the two parallel waveguides.

8. The optical waveguide device according to claim 1, wherein
in the two signal lines, portions intersecting the parallel waveguide overlap each other in plan view of the substrate.

9. An optical modulator comprising:
the optical waveguide device according to claim 1, which is an optical modulation device that modulates light;
a housing that houses the optical waveguide device;
an optical fiber that inputs light to the optical waveguide device; and
an optical fiber that guides light output by the optical waveguide device to outside the housing.

10. An optical transmission apparatus comprising:
the optical modulator according to claim 9; and
an electronic circuit that generates an electrical signal for causing the optical waveguide device to perform a modulation operation.

11. An optical modulation module comprising:
the optical waveguide device according to claim 1, which is an optical modulation device that modulates light; and
a drive circuit that drives the optical waveguide device.

12. An optical transmission apparatus comprising:
the optical modulation module according to claim 11; and
an electronic circuit that generates an electrical signal for causing the optical waveguide device to perform a modulation operation.

13. The optical waveguide device according to claim 1, wherein the two signal lines for transmitting the differential signal respectively transmit differential signals of opposite phases.

* * * * *